U S010841930B2

(12) United States Patent
Gao et al.

(10) Patent No.: US 10,841,930 B2
(45) Date of Patent: Nov. 17, 2020

(54) WIRELESS COMMUNICATION WITH SHARED RESOURCES FOR DIFFERENT RADIO ACCESS TECHNOLOGIES, BASE STATION, AND TERMINAL

(71) Applicant: Huawei Technologies Co., Ltd., Shenzhen (CN)

(72) Inventors: Quanzhong Gao, Shanghai (CN); Chaoyi Yan, Shenzhen (CN); Heng Xu, Shanghai (CN); Chao Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/295,383

(22) Filed: Mar. 7, 2019

(65) Prior Publication Data

US 2019/0208530 A1 Jul. 4, 2019

Related U.S. Application Data

(63) Continuation of application No. PCT/CN2016/098370, filed on Sep. 8, 2016.

(51) Int. Cl.
*H04W 72/12* (2009.01)
*H04L 5/00* (2006.01)
(Continued)

(52) U.S. Cl.
CPC ....... *H04W 72/1205* (2013.01); *H04W 16/14* (2013.01); *H04W 72/04* (2013.01);
(Continued)

(58) Field of Classification Search
CPC . H04W 72/1205; H04W 72/12; H04W 72/04; H04W 72/0446; H04W 16/14; H04L 5/0005
See application file for complete search history.

(56) References Cited

U.S. PATENT DOCUMENTS

2014/0003349 A1* 1/2014 Kang ............... H04L 5/0091
370/328
2015/0341838 A1* 11/2015 Pinheiro ............ H04L 63/0428
455/449

(Continued)

FOREIGN PATENT DOCUMENTS

CN 102387507 A 3/2012
CN 103379636 A 10/2013
(Continued)

*Primary Examiner* — Kiet Tang
(74) *Attorney, Agent, or Firm* — Slater Matsil, LLP

(57) ABSTRACT

A wireless communication method, a base station and a terminal are disclosed. In an embodiment a method includes determining, by a base station, a first resource and a second resource from a target resource, wherein the target resource is a resource shared by at least one terminal in a first Radio Access Technology (RAT) and at least one terminal in a second RAT, the first resource being a resource used by the terminal in the first RAT, and the second resource being a resource used by the terminal in the second RAT, sending, by the base station, first indication information to the terminal in the first RAT, wherein the first indication information is used to indicate the first resource to be used by the terminal in the first RAT and sending, by the base station, second indication information to the terminal in the second RAT, wherein the second indication information is used to indicate the second resource to be used by the terminal in the second RAT.

20 Claims, 22 Drawing Sheets

A terminal in a first RAT receives first indication information sent by a base station, where the first indication information is used to indicate a first resource that is in a target resource and that is used by the first terminal, the target resource is a resource shared by the terminal in the first RAT and a terminal in a second RAT, and the terminal in the second RAT uses a second resource in the target resource ⟶ S2510

▼

The terminal in the first RAT performs data transmission with the base station on the first resource based on the first indication information ⟶ S2520

(51) Int. Cl.
*H04L 29/06* (2006.01)
*H04W 72/04* (2009.01)
*H04W 16/14* (2009.01)

(52) U.S. Cl.
CPC ....... *H04W 72/0446* (2013.01); *H04W 72/12* (2013.01); *H04L 5/0005* (2013.01)

(56) References Cited

U.S. PATENT DOCUMENTS

| | | |
|---|---|---|
| 2016/0044688 A1 | 2/2016 | Deng et al. |
| 2016/0242200 A1 | 8/2016 | Yan et al. |
| 2018/0020375 A1* | 1/2018 | Matsumoto ........ G02B 27/0172 |

FOREIGN PATENT DOCUMENTS

| | | |
|---|---|---|
| CN | 105657831 A | 6/2016 |
| WO | 2014169486 A1 | 10/2014 |

\* cited by examiner

WIRELESS COMMUNICATION WITH SHARED RESOURCES FOR DIFFERENT RADIO ACCESS TECHNOLOGIES, BASE STATION, AND TERMINAL

CROSS-REFERENCE TO RELATED APPLICATIONS

This application is a continuation of International Patent Application No. PCT/CN2016/098370, filed on Sep. 8, 2016, the disclosure of which is hereby incorporated by reference in its entirety.

TECHNICAL FIELD

The present invention relates to the communications field, and in particular, to a wireless communication method, a base station, and a terminal.

BACKGROUND

With development and increasing maturity of the 4th Generation (4G) communications technology, the 5th Generation (5G) communications technology is also increasingly and widely researched. In a 5G network development process, a case in which a same network includes both a 4G terminal and a 5G terminal inevitably appears. In a 4G network, resources of 1.8 GHz to 2.5 GHz frequency bands are mainly used for data transmission. Uplink and downlink data transmission is divided by using different times, and a same frequency domain resource is used in an uplink and a downlink. In a 5G network, a resource occupied by a wider spectrum may be used. In addition, to control a transmission latency within 1 ms, a more flexible subframe configuration is required, and because the 5G network has a forward compatibility capability, all resources of the 4G network can be used. Therefore, when two different terminals simultaneously transmit data on a same resource, because the two terminals have different RATs (Radio Access Technologies), the two terminals conflict with each other on the same resource. In other words, the terminals in the two different RATs interfere with each other when transmitting the data on the same resource.

In the prior art, a solution in which a 4G terminal is allowed to use all same resources, and a 5G terminal is allowed to use resources dedicated to the 5G terminal is mainly used, to resolve a problem that the terminals in two RATs interfere with each other on a same resource. For example, for a frequency domain resource, the 4G terminal uses a frequency domain resource shared with the 5G terminal, and the 5G terminal uses a frequency domain resource dedicated to the 5G terminal.

However, in the same network, quantities of terminals in different RATs and quantities of resources required by the terminals in the different RATs are greatly different from each other. For example, when a number of 4G terminals in the network is relatively small, a number of resources required by the 4G terminal is relatively small. In this case, utilization of shared resources of the terminals in the two RATs is low, thereby resulting in a waste of the resources.

SUMMARY

Embodiments provide a wireless communication method, a base station, and a terminal, to improve utilization of shared resources of terminals in different RATs (Radio Access Technologies).

According to a first embodiment, a wireless communication method is provided and includes: determining, by a base station, a first resource and a second resource from a target resource, where the target resource is a resource shared by a terminal in a first RAT and a terminal in a second RAT, the first resource is a resource used by the terminal in the first RAT, and the second resource is a resource used by the terminal in the second RAT; sending, by the base station, first indication information to the terminal in the first RAT, where the first indication information is used to indicate the first resource used by the terminal in the first RAT; and sending, by the base station, second indication information to the terminal in the second RAT, where the second indication information is used to indicate the second resource used by the terminal in the second RAT.

According to embodiments, the base station determines, from the resource shared by the terminal in the first RAT and the terminal in the second RAT, the first resource used by the terminal in the first RAT and the second resource used by the terminal in the second RAT, and allocates the resource shared by the terminal in the first RAT and the terminal in the second RAT to both the terminal in the first RAT and the terminal in the second RAT for use, to avoid a problem that shared resources are wasted because the terminal in the first RAT or the terminal in the second RAT separately uses the shared resources, thereby improving utilization of the shared resources.

With reference to the first embodiment, in some implementations of the first embodiment, the determining, by a base station, a first resource and a second resource from a target resource includes: obtaining, by the base station, a network parameter, where the network parameter includes at least one of the following parameters: a scheduling period, a quantity of resources required by the terminal in the first RAT, an available cell connection spectrum bandwidth of the terminal in the first RAT, a time-frequency resource occupied by the terminal in the first RAT, a quantity of resources required by the terminal in the second RAT, an available cell connection spectrum bandwidth of the terminal in the second RAT, or a time-frequency resource occupied by the terminal in the second RAT; and determining, by the base station, the first resource and the second resource from the target resource based on the network parameter.

With reference to the first embodiment, in some implementations of the first embodiment, the determining, by a base station, a first resource and a second resource from a target resource includes: determining, by the base station, the first resource and the second resource in an initialization process.

With reference to the first embodiment, in some implementations of the first embodiment, the determining, by the base station, the first resource and the second resource from the target resource based on the network parameter includes: determining, by the base station, a third resource pre-allocated to the terminal in the first RAT and a fourth resource pre-allocated to the terminal in the second RAT, where the target resource includes the third resource, the fourth resource, and a remaining resource other than the third resource and the fourth resource; and dividing, by the base station, the remaining resource based on the network parameter, to determine the first resource and the second resource, where the first resource includes the third resource, the second resource includes the fourth resource, and a sum of the first resource and the second resource includes the remaining resource.

With reference to the first embodiment, in some implementations of the first embodiment, the determining, by the base station, the first resource and the second resource from the target resource based on the network parameter includes: directly determining, by the base station, the first resource and the second resource from the target resource based on the network parameter.

With reference to the first embodiment, in some implementations of the first embodiment, the dividing the remaining resource based on the network parameter, to determine the first resource and the second resource includes: determining, by the base station based on the network parameter, a first reference resource required by the terminal in the first RAT; and when the first reference resource is less than the third resource, determining, by the base station, the third resource as the first resource, and determining the fourth resource and the remaining resource as the second resource; or when the first reference resource is greater than a sum of the third resource and the remaining resource, determining, by the base station, the sum of the third resource and the remaining resource as the first resource, and determining the fourth resource as the second resource; or when the first reference resource is greater than the third resource, and is less than a sum of the third resource and the remaining resource, determining, by the base station, the first reference resource as the first resource, and determining a resource in the shared resource other than the first reference resource as the second resource.

With reference to the first embodiment, in some implementations of the first embodiment, the method further includes: when the quantity of resources required by the terminal in the first RAT is greater than the quantity of resources required by the terminal in the second RAT, sending, by the base station, a subframe to the terminal in the second RAT, where the subframe is used to instruct the terminal in the second RAT to stop transmitting data on the second resource.

With reference to the first embodiment, in some implementations of the first embodiment, the target resource is a resource in a resource allocation period, the resource allocation period includes N scheduling periods, and N is greater than or equal to 1.

With reference to the first embodiment, in some implementations of the first embodiment, the shared resource is a shared time domain resource, a shared frequency domain resource, or a shared time-frequency resource.

For example, a time domain resource shared by the terminal in the first RAT and the terminal in the second RAT may be transmission duration, a system frame, a subframe, or the like. A frequency domain resource shared by the terminal in the first RAT and the terminal in the second RAT may be frequency bandwidth, a subcarrier, a spectrum resource, or the like. A time-frequency resource shared by the terminal in the first RAT and the terminal in the second RAT may be a resource block (RB) or the like.

With reference to the first embodiment, in some implementations of the first embodiment, the terminal in the first RAT is a 4th Generation 4G mobile communication terminal, and the terminal in the second RAT is a 5th Generation 5G mobile communication terminal.

According to a second embodiment, a wireless communication method is provided and includes: receiving, by a terminal in a first RAT, first indication information sent by a base station, where the first indication information is used to indicate a first resource that is in a target resource and that is used by the terminal in the first RAT, the target resource is a resource shared by the terminal in the first RAT and a terminal in a second RAT, and the terminal in the second RAT uses a second resource in the target resource; and performing, by the terminal in the first RAT, data transmission with the base station on the first resource based on the first indication information.

With reference to the second embodiment, in some implementations of the second embodiment, the first resource is determined by the base station from the target resource based on a network parameter, and the network parameter includes at least one of the following parameters: a scheduling period, a quantity of resources required by the terminal in the first RAT, an available cell connection spectrum bandwidth of the terminal in the first RAT, a time-frequency resource occupied by the terminal in the first RAT, a quantity of resources required by the terminal in the second RAT, an available cell connection spectrum bandwidth of the terminal in the second RAT, or a time-frequency resource occupied by the terminal in the second RAT.

With reference to the second embodiment, in some implementations of the second embodiment, the method further includes: receiving, by the terminal in the first RAT, a subframe sent by the base station, where the subframe is used to instruct the terminal in the first RAT to stop transmitting data on the first resource.

With reference to the second embodiment, in some implementations of the second embodiment, the target resource is a resource in a resource allocation period, the resource allocation period includes N scheduling periods, and N is greater than or equal to 1.

With reference to the second embodiment, in some implementations of the second embodiment, the shared resource is a shared time domain resource, a shared frequency domain resource, or a shared time-frequency resource.

With reference to the second embodiment, in some implementations of the second embodiment, the terminal in the first RAT is a 5th Generation 5G mobile communication terminal or a 4th Generation 4G mobile communication terminal.

According to a third embodiment, a base station is provided and includes units or modules configured to perform the method described in any one of the first embodiment and the implementations of the first embodiment.

According to a fourth embodiment, a terminal is provided and includes units or modules configured to perform the method described in any one of the second embodiment and the implementations of the second embodiment.

According to a fifth embodiment, a base station is provided and includes a memory, a processor, and a transceiver. The memory is configured to store a program, the processor is configured to execute the program, and when executing the program, the processor is specifically configured to perform the method described in any one of the first embodiment and the implementations of the first embodiment.

According to a sixth embodiment, a terminal is provided and includes a memory, a processor, and a transceiver. The memory is configured to store a program, the processor is configured to execute the program, and when executing the program, the processor is specifically configured to perform the method described in any one of the second embodiment and the implementations of the second embodiment.

According to a seventh embodiment, a computer readable medium is provided, and the computer readable medium is configured to store program code. The program code includes an instruction used to perform the method described in any one of the first embodiment and the implementations of the first embodiment.

According to an eighth embodiment, a computer readable medium is provided, and the computer readable medium is configured to store program code. The program code includes an instruction used to perform the method described in any one of the second embodiment and the implementations of the second embodiment.

According to a ninth embodiment, a wireless communications system is provided and includes the base station in the third embodiment and the terminal in the fourth embodiment.

In some embodiments, the frequency domain resource may be a spectrum resource or spectrum bandwidth.

In some embodiments, the time domain resource may be transmission duration or a transmission time.

DETAILED DESCRIPTION OF ILLUSTRATIVE EMBODIMENTS

The following clearly and describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

It should be understood that the technical solutions may be applied to various communications systems, such as a Global System for Mobile Communications ("GSM" for short), a Code Division Multiple Access ("CDMA" for short) system, a Wideband Code Division Multiple Access ("WCDMA" for short) system, a general packet radio service ("GPRS" for short) system, a Long Term Evolution ("LTE" for short) system, and a future 5G communications system.

It should be further understood that, a terminal may include user equipment (UE), also referred to as a mobile terminal, mobile user equipment, and the like, and may communicate with one or more core networks through a radio access network (for example, RAN). The user equipment may be a mobile terminal, such as a mobile phone (also referred to as a "cellular" phone) and a computer with a mobile terminal. For example, the user equipment may be a portable, pocket-sized, handheld, computer built-in, or in-vehicle mobile apparatus, which exchanges voice and/or data with the radio access network.

It should be further understood that in the technical solutions, terminals in a same network system may be terminals in different RATs (Radio Access Technologies). For example, a 4G network system may include a 4G terminal, or may include both a 4G terminal and a 5G terminal.

A base station may be a base transceiver station (BTS) in GSM or CDMA, may be a NodeB in WCDMA, may be an evolved NodeB (eNB or eNodeB) in LTE, or may be a base station in a future 5G network. This is not limited to embodiments of the invention. However, for ease of description, the following embodiments are described by using an eNodeB as an example.

Figure 1:
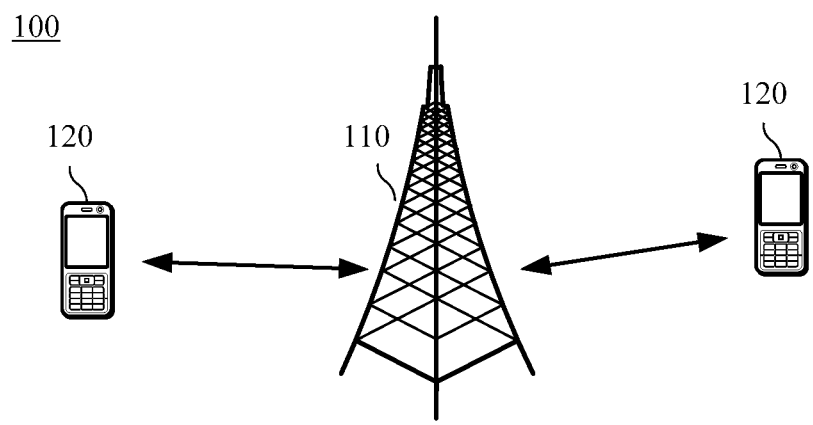
FIG. 1 is a schematic diagram of a communications system to which an embodiment can be applied.

FIG. 1 shows a communications system 100 to which an embodiment is applied. The communications system 100 may include at least one network device 110. The network device 110 may be a device that communicates with a terminal, for example, a base station or a base station controller. Each network device 110 may provide communication coverage for a specific geographic area, and may communicate with a terminal (for example, UE) located in the coverage area (a cell). The network device 110 may be a base transceiver station ("BTS" for short) in a GSM system or a Code Division Multiple Access ("CDMA" for short) system, may be a NodeB ("NB" for short) in a WCDMA system, may be an evolved NodeB ("eNB" or "eNodeB" for short) in an LTE system, or may be a radio controller in a cloud radio access network ("CRAN" for short). Alternatively, the network device 110 may be a relay node, an access point, an in-vehicle device, a wearable device, a network side device in a future 5G network, a network device in a future evolved public land mobile network ("PLMN" for short), or the like.

The wireless communications system 100 further includes a plurality of terminals 120 located in a coverage area of the network device 110. The plurality of terminals may be terminals in different RATs. For example, two terminals shown in FIG. 1 may be respectively a 4G terminal and a 5G terminal. It should be understood that quantities of terminal in different RATs in the plurality of terminal 120 in the coverage area of the network 110 may be different. FIG. 1 shows an example of one network device and two terminal. Optionally, the communications system 100 may include a plurality of network devices, and another quantity of terminal may be included in a coverage area of each network device. This is not limited in this embodiment of the invention.

Optionally, the wireless communications system 100 may further include another network entity such as a network controller and a mobility management entity. This is not limited in this embodiment of the invention.

Figure 2:
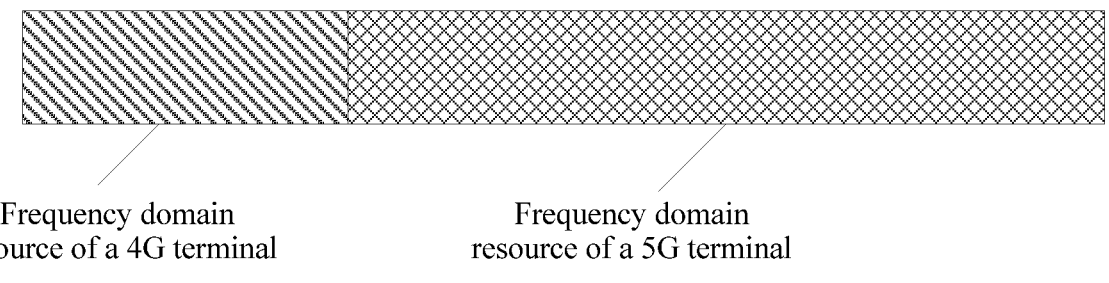
FIG. 2 is a time domain diagram of frequency domain resource allocation for a 4G terminal and a 5G terminal in the prior art.

FIG. 2 shows frequency domain resources used by a 4G terminal and a 5G terminal in a same network in the prior art. It can be learned from the figure that the 4G terminal uses all frequency domain resources shared with the 5G terminal, and the 5G terminal uses a frequency domain resource occupied by a higher frequency band, to implement frequency division multiplexing, and avoid a resource conflict between the terminals in two different RATs.

In this case, when a quantity of 4G terminals in the network is relatively small, utilization of the frequency domain resources shared by the 4G terminal and the 5G terminal is reduced, thereby resulting in a waste of the frequency domain resources. The following describes in detail a wireless communication method in an embodiment with reference to FIG. 3.

Figure 3:
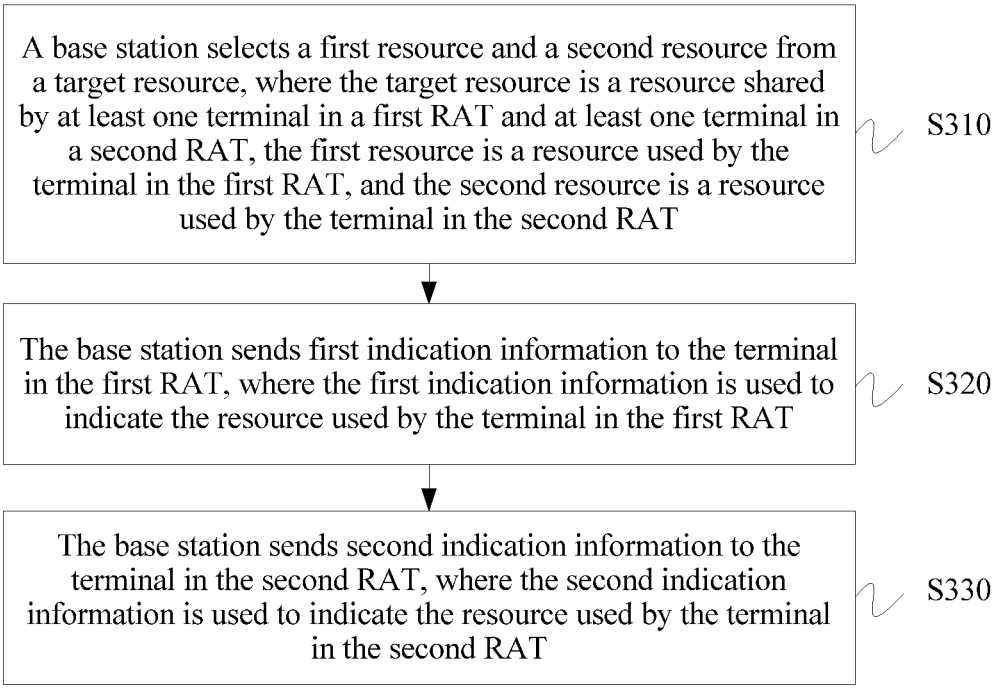
FIG. 3 is a schematic flowchart of a wireless communication method according to an embodiment.

FIG. 3 is a schematic flowchart of a wireless communication method according to an embodiment. The method includes the following steps:

S310. A base station determines a first resource and a second resource from a target resource, where the target resource is a resource shared by a terminal in a first RAT and a terminal in a second RAT, the first resource is a resource used by the terminal in the first RAT, and the second resource is a resource used by the terminal in the second RAT.

S320. The base station sends first indication information to the terminal in the first RAT, where the first indication information is used to indicate the resource used by the terminal in the first RAT.

S330. The base station sends second indication information to the terminal in the second RAT, where the second indication information is used to indicate the resource used by the terminal in the second RAT.

In this embodiment, the base station determines, from the resource shared by the terminal in the first RAT and the terminal in the second RAT, the first resource used by the terminal in the first RAT and the second resource used by the terminal in the second RAT, and allocates the resource shared by the terminal in the first RAT and the terminal in the second RAT to both the terminal in the first RAT and the terminal in the second RAT for use, to avoid a problem that shared resources are wasted because the terminal in the first RAT or the terminal in the second RAT separately uses the shared resources, thereby improving utilization of the shared resources.

Optionally, in some embodiments, the terminal in the first RAT may be a terminal in a 4G mode, and the terminal in the second RAT may be a terminal in a 5G mode, but embodiments of the invention are not limited thereto. For example, the terminal in the first RAT may alternatively be a 3rd Generation (3G) mobile communication terminal, and the terminal in the second RAT may alternatively be a 4G terminal.

Optionally, in some embodiments, the resource shared by the terminal in the first RAT and the terminal in the second RAT may be a shared time domain resource, a shared frequency domain resource, or a shared time-frequency resource.

For example, a time domain resource shared by the terminal in the first RAT and the terminal in the second RAT may be transmission duration, a system frame, a subframe, or the like. A frequency domain resource shared by the terminal in the first RAT and the terminal in the second RAT may be frequency bandwidth, a subcarrier, a spectrum resource, or the like. A time-frequency resource shared by the terminal in the first RAT and the terminal in the second RAT may be a resource block (RB) or the like.

Optionally, in some embodiments, the first resource selected by the base station for the terminal in the first RAT and the second resource selected by the base station for the terminal in the second RAT may be consecutive resources or inconsecutive resources.

Optionally, in some embodiments, the target resource may be a resource in a resource allocation period, the resource allocation period includes N scheduling periods, and N is greater than or equal to 1.

Specifically, the base station may determine the first resource and the second resource from the target resource in each resource allocation period, to periodically allocate the target resource, so that different first resources and second resources can be allocated to the terminals in two RATs in different resource allocation periods, to further improve utilization of shared resources.

Specifically, in this embodiment, the base station may perform, in each resource allocation period, resource allocation once on the target resource in the resource allocation period. In a current resource allocation period, the base station performs data transmission with the terminals in different RATs based on a result of determining a currently shared resource. In a next resource allocation period, the base station may re-determine, from the target resource, the first resource used by the terminal in the first RAT and the second resource used by the terminal in the second RAT.

It should be understood that in this embodiment, the resource allocation period may include one scheduling period. In this case, allocation performed by the base station on the target resource in each resource allocation period may be referred to as dynamic allocation. Alternatively, the resource allocation period may include a plurality of scheduling periods. In this case, allocation performed by the base station on the target resource in each resource allocation period may be referred to as semi-static allocation. Alternatively, the resource allocation period may include an infinite quantity of scheduling periods. In this case, allocation performed by the base station on the target resource may be referred to as static allocation.

Optionally, in some embodiments, the determining, by a base station, a first resource and a second resource from a target resource may include: receiving, by the base station, indication information sent by a core network element, where the indication information is used to indicate the resource used by the terminal in the first RAT and the resource used by the terminal in the second RAT; and determining, by the base station, the first resource and the second resource from the target resource based on the indication information.

Optionally, in some embodiments, the determining, by a base station, a first resource and a second resource from a target resource may include: presetting, by the base station, the first resource and the second resource in an initialization process.

Figure 4:
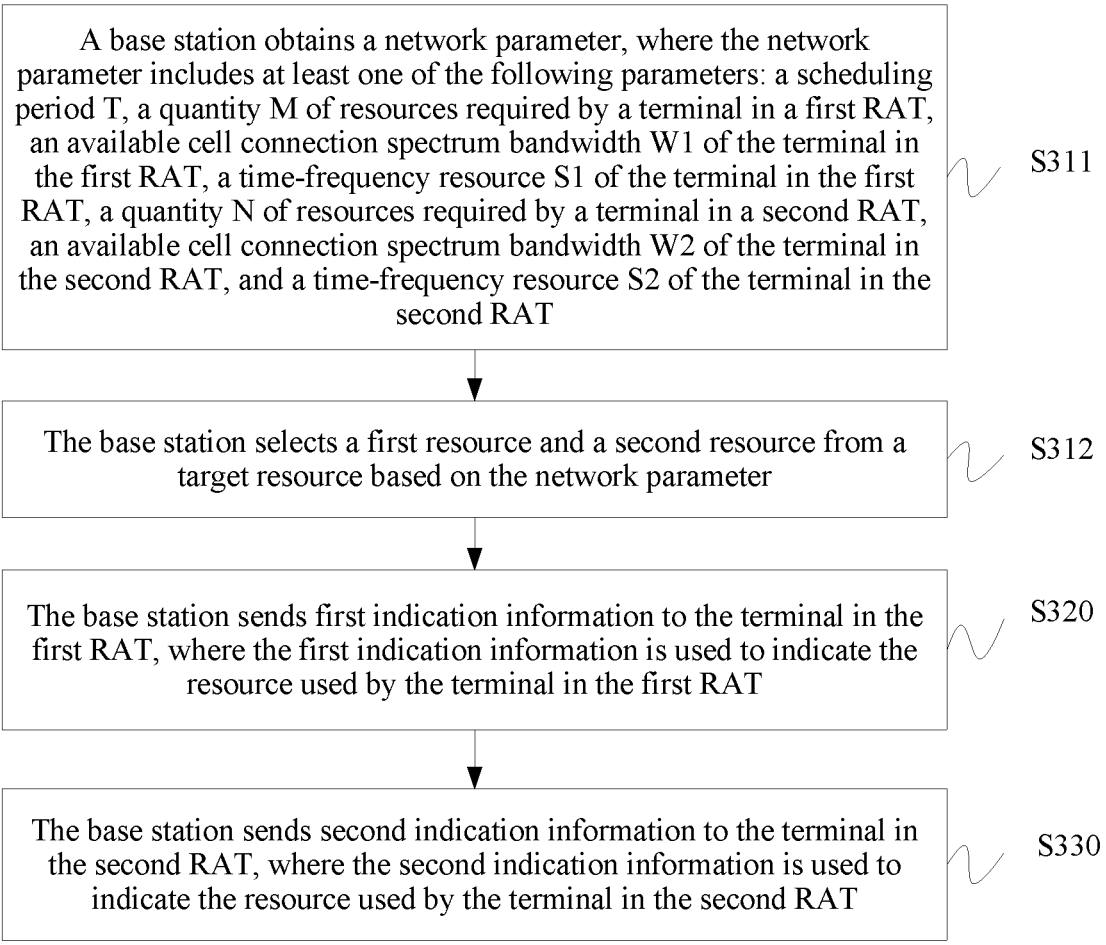
FIG. 4 is a schematic flowchart of a wireless communication method according to another embodiment.

Optionally, in some embodiments, as shown in FIG. 4, the determining, by a base station, a first resource and a second resource from a target resource may further include the following steps:

S311. The base station obtains a network parameter, where the network parameter includes at least one of the following parameters: a scheduling period, a quantity of resources required by the terminal in the first RAT, an available cell connection spectrum bandwidth of the terminal in the first RAT, a time-frequency resource occupied by the terminal in the first RAT, a quantity of resources required by the terminal in the second RAT, an available cell connection spectrum bandwidth of the terminal in the second RAT, or a time-frequency resource occupied by the terminal in the second RAT.

S312. The base station determines the first resource and the second resource from the target resource based on the network parameter.

In this embodiment, the base station may determine, from the target resource based on the network parameter, the first resource used by the terminal in the first RAT and the second resource used by the terminal in the second RAT, to more properly allocate shared resources to the terminals in two different RATs, improve utilization of the shared resources, and avoid a waste of the shared resources.

It should be understood that in this embodiment, the scheduling period may be a scheduling period in which the base station schedules the terminal in the first RAT, or a scheduling period in which the base station schedules the terminal in the second RAT.

Optionally, in some embodiments, the base station may select the first resource and the second resource from the target resource based on the network parameter in a plurality of manners. In an implementation, the base station may directly allocate the target resource based on the network parameter.

Specifically, as described above, the resource shared by the terminal in the first RAT and the terminal in the second RAT may be a time domain resource, a frequency domain resource, or a time-frequency resource. The terminal in the first RAT may be a 4G terminal, and the terminal in the second RAT may be a 5G terminal. The following separately describes, in detail by using an example in which the terminal in the first RAT may be the 4G terminal and the terminal in the second RAT may be the 5G terminal from a perspective that the shared resource is the time domain resource, a perspective that the shared resource is the frequency domain resource, and a perspective that the shared resource is the time-frequency resource, a method in which the base station determines the first resource and the second resource from the target resource based on the network parameter in this embodiment.

The following first describes, in detail by using an example in which the resource shared by the terminal in the first RAT and the terminal in the second RAT in a scheduling period is the time domain resource, a method in which the base station determines, based on the network parameter, a first time domain resource used by the terminal in the first RAT and a second time domain resource used by the terminal in the second RAT.

Specifically, in this embodiment, the selecting, from a time domain resource shared by the 4G terminal and the 5G terminal, a first time domain resource used by the 4G terminal and a second time domain resource used by the 5G terminal may include the following steps:

(1) The base station may obtain the following network parameters: a scheduling period T, a quantity M of resources required by the 4G terminal, a quantity N of resources required by the 5G terminal, an available cell connection spectrum bandwidth W1 occupied by the 4G terminal, and an available cell connection spectrum bandwidth W2 occupied by the 5G terminal.

(2) After obtaining the network parameters in step (1), the base station calculates transmission times of the 4G terminal and the 5G terminal based on the obtained network parameters, namely, time domain resources required by the 4G terminal and the 5G terminal in a scheduling period.

It should be understood that the transmission times of the 4G terminal and the 5G terminal that are calculated in this step are based on quantities of resources required by the terminals in two different RATs. In specific implementation, the transmission times of the 4G terminal and the 5G terminal may be obtained through calculation according to the following formulas:

$$T1 = \frac{M*W2}{M*W2 + N*W1} * T \quad (1)$$

$$T2 = \frac{N*W1}{M*W2 + N*W1} * T \quad (2)$$

After performing the foregoing steps, the base station may determine a transmission time T1 of the 4G terminal as the first time domain resource, and determine a transmission time T2 of the 5G terminal as the second time domain resource.

Optionally, in an embodiment, as described above, the target resource may be a resource in a resource allocation period.

Figure 5:
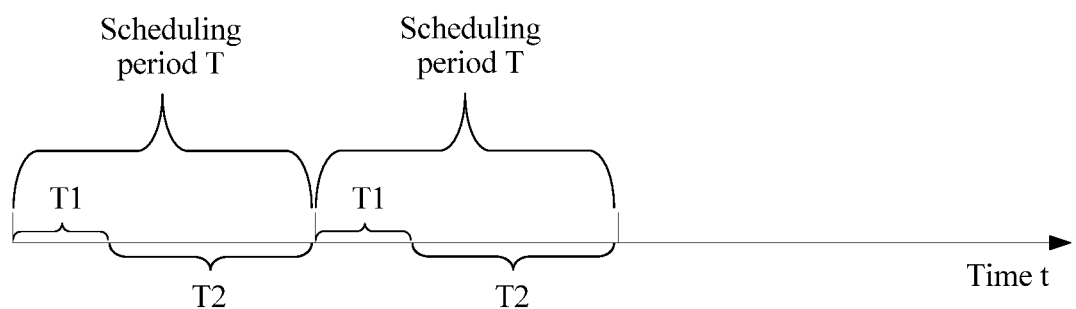
FIG. 5 is a schematic diagram of static allocation of a time domain resource according to an embodiment.

Specifically, in this embodiment, the base station may determine the first resource and the second resource from the target resource based on the network parameter in each resource allocation period. When the resource allocation period may include an infinite quantity of scheduling periods T, in other words, allocation performed by the base station on the shared time domain resource is static allocation, the base station performs time domain resource allocation only once. Specifically, a schematic diagram of time domain resource allocation is shown in FIG. 5. It can be learned from the figure that the base station performs time domain resource allocation once, and in each subsequent scheduling period T, both the terminals in two different RATs transmit data based on the time domain resources allocated by the base station.

Figure 6:
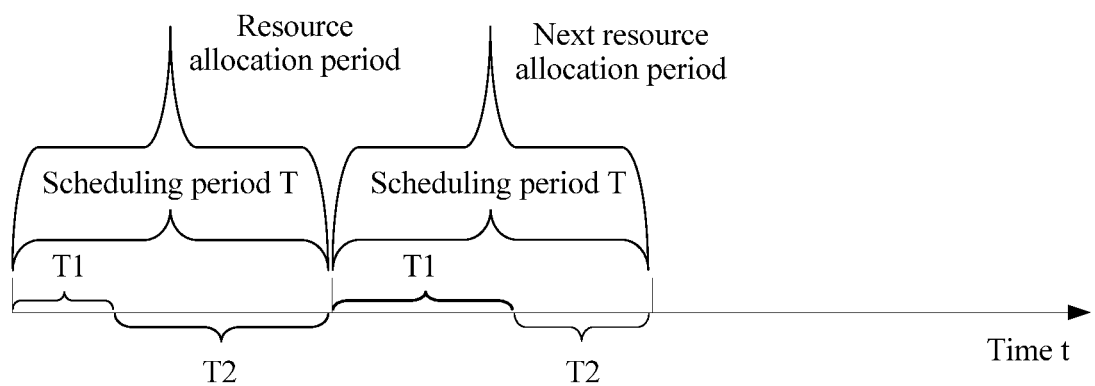
FIG. 6 is a schematic diagram of dynamic allocation of a time domain resource according to an embodiment.

It should be understood that the resource allocation period may alternatively include one scheduling period. In this case, the base station determines the first time domain resource and the second time domain resource from the target resource based on the network parameter in each scheduling period. Specifically, a schematic diagram of time domain resource allocation is shown in FIG. 6. It can be learned from the figure that the base station performs resource allocation once based on the network parameter in each resource allocation period, namely, in each scheduling period, and the terminals in two different RATs may transmit data based on the time domain resources allocated by the base station in each scheduling period.

Figure 7:
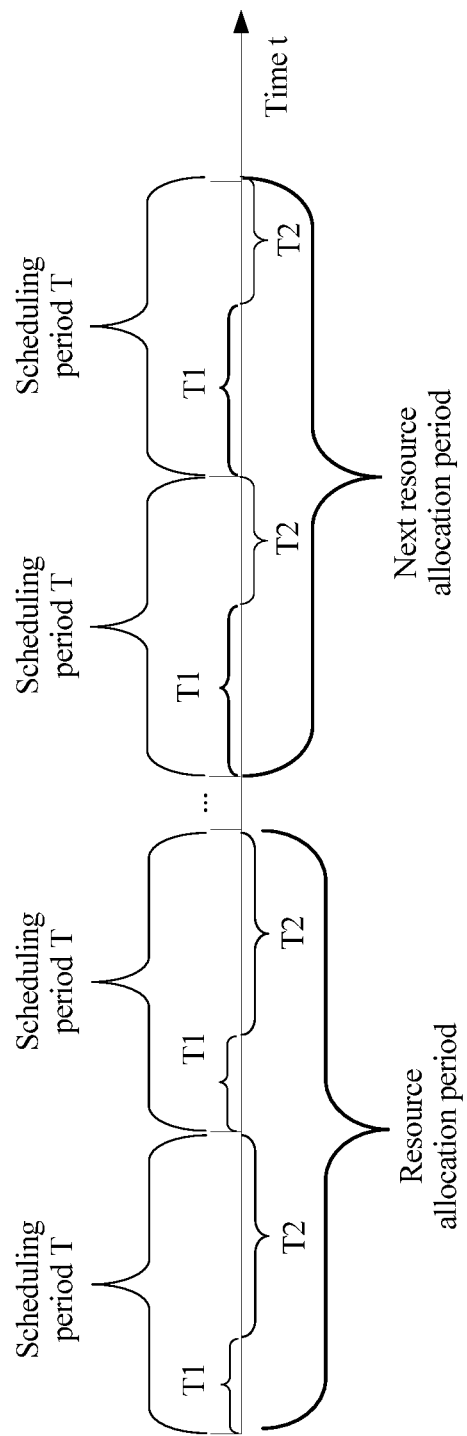
FIG. 7 is a schematic diagram of semi-static allocation of a time domain resource according to an embodiment.

It should be further understood that the resource allocation period may include a plurality of scheduling periods. In each scheduling period in a resource allocation period, the terminals in two different RATs may transmit data based on the time domain resources allocated by the base station. In a next resource allocation period, the base station reselects the first time domain resource for the 4G terminal from the target resource based on the network parameter, and reselects the second time domain resource for the 5G terminal from the target resource based on the network parameter. Specifically, a schematic diagram of time domain resource allocation is shown in FIG. 7. It can be learned from FIG. 7 that the resource allocation period includes two scheduling periods T, but this embodiment is not limited thereto.

It should be further understood that the base station may allocate the first time domain resource to the 4G terminal based on the network parameter, and allocate the second time domain resource to the 5G terminal based on the network parameter. The first time domain resource and the second time domain resource may be consecutive time domain resources or inconsecutive time domain resources.

The foregoing describes in detail the method in which the base station selects, from a target time domain resource based on the network parameter, the first time domain resource used by the 4G terminal and the second time domain resource used by the 5G terminal. The following describes in detail a method in which the base station selects, from a target frequency domain resource based on the network parameter, a first frequency domain resource used by the 4G terminal and a second frequency domain resource used by the 5G terminal.

Specifically, in this embodiment, the selecting, by the base station from a frequency domain resource shared by the 4G terminal and the 5G terminal, a first frequency domain resource used by the 4G terminal and a second frequency domain resource used by the 5G terminal may include the following steps:

(1) The base station may obtain the following network parameters: a quantity M of resources required by the 4G terminal, a quantity N of resources required by the 5G terminal, an available cell connection spectrum bandwidth W1 occupied by the 4G terminal, and an available cell connection spectrum bandwidth W2 occupied by the 5G terminal.

Figure 8:
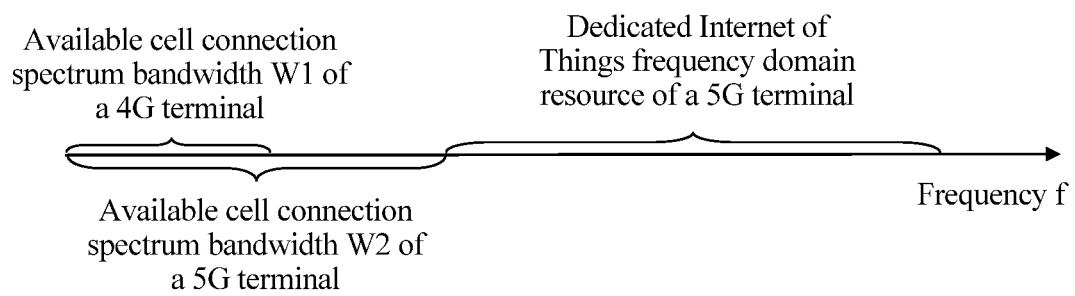
FIG. 8 is a schematic diagram of frequency domain resources used by a 4G terminal and a 5G terminal in the prior art.

It should be understood that in this embodiment, as a forward-compatible terminal, the 5G terminal may use the whole available spectrum bandwidth W1 occupied by the 4G terminal, and W1 may be the frequency domain resource shared by the 4G terminal and the 5G terminal. FIG. 8 is a schematic diagram of frequency domain resources that can be used by a 4G terminal and a 5G terminal. It can be learned from the figure that a frequency domain resource available to the 5G terminal may be divided into the available cell connection spectrum bandwidth W2 occupied by the 5G terminal and a dedicated Internet of Things frequency domain resource occupied by the 5G terminal. The available cell connection spectrum bandwidth W2 occupied by the 5G terminal may include the available cell connection spectrum bandwidth W1 occupied by the 4G terminal.

(2) After obtaining the network parameters in step (1), the base station calculates, based on the obtained network parameters, a spectrum resource B1 required by the 4G terminal and a spectrum resource B2 required by the 5G terminal.

In specific implementation, frequency domain resources required by the 4G terminal and the 5G terminal may be obtained through calculation according to the following formulas:

$$B1 = \frac{W2 * M}{M + N} \quad (3)$$

$$B2 = \frac{W2 * N}{M + N} \quad (4)$$

Specifically, a frequency domain resource allocation manner may be described as follows:

When B1 is greater than or equal to W1, in this case, a quantity of required frequency domain resources of the 4G terminal in a network is relatively large, the whole spectrum bandwidth W1 shared by the 4G terminal and the 5G terminal may be determined as the first frequency domain resource, and the second frequency domain resource is null. In this case, the available cell connection spectrum resource B2 of the 5G terminal may be a remaining frequency domain resource in the available cell connection spectrum resource W2 occupied by the 5G terminal other than the available frequency domain resource W1 occupied by the 4G terminal.

When B1 is less than W1, in other words, a quantity of required frequency domain resources of the 4G terminal is less than the available cell connection frequency domain resource W1 occupied by the 4G terminal, in this case, B1 may be determined as the first frequency domain resource used by the 4G terminal, and a frequency domain resource in the frequency domain resource W1 shared by the 4G terminal and the 5G terminal other than B1 may be determined as the second frequency domain resource. In this case, the available cell connection spectrum resource occupied by the 5G terminal may be a remaining frequency domain resource in the available cell connection spectrum resource W2 occupied by the 5G terminal other than the available frequency domain resource B1 of the 4G terminal. The remaining frequency domain resource is the frequency domain resource B2.

It should be understood that the foregoing method in which the base station selects, based on calculation results of the formulas (3) and (4), the first frequency domain resource used by the 4G terminal and the second frequency domain resource used by the 5G terminal is merely an example for description. This embodiment is not limited thereto. For example, in this embodiment, the base station may alternatively select, based on calculation results of formulas (5) and (6), the first frequency domain resource used by the 4G terminal and the second frequency domain resource used by the 5G terminal:

$$B1' = \frac{W1 * M}{M + N} \quad (5)$$

$$B2' = \frac{W1 * N}{M + N} \quad (6)$$

The base station obtains, through calculation by using the formulas (5) and (6), a frequency domain resource B1' required by the 4G terminal and a frequency domain resource B2' required by the 5G terminal. A sum of B1' and B2' is the frequency domain resource W1 shared by the 4G terminal and the 5G terminal. In this case, the base station may determine B1' as the first frequency domain resource, and determine B2' as the second frequency domain resource. Therefore, after allocation, the available cell connection frequency domain resource occupied by the 4G terminal may be B1', and the available cell connection frequency domain resource occupied by the 5G terminal may be a frequency domain resource in W2 other than B1' used by the 4G terminal.

Optionally, in some embodiments, as described above, the target resource may be a resource in a resource allocation period.

Figure 9:
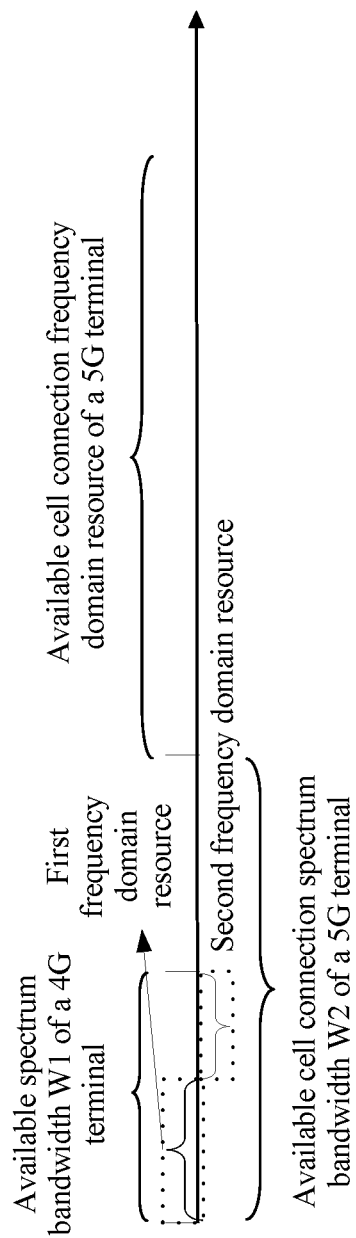
FIG. 9 is a schematic diagram of static allocation of a frequency domain resource according to an embodiment.

Specifically, in this embodiment, the base station may determine the first frequency domain resource and the second frequency domain resource based on the network parameter in each resource allocation period. When the resource allocation period may include an infinite quantity of scheduling periods T, in other words, allocation performed by the base station on the shared frequency domain resource is static allocation, the base station performs frequency domain resource allocation only once. Specifically, a schematic diagram of frequency domain resource allocation is shown in FIG. 9. It can be learned from the figure that the base station determines the first frequency domain resource and the second frequency domain resource based on the network parameter, and in each subsequent scheduling period, both the terminals in two different RATs transmit data based on the frequency domain resources allocated by the base station.

Figure 10:
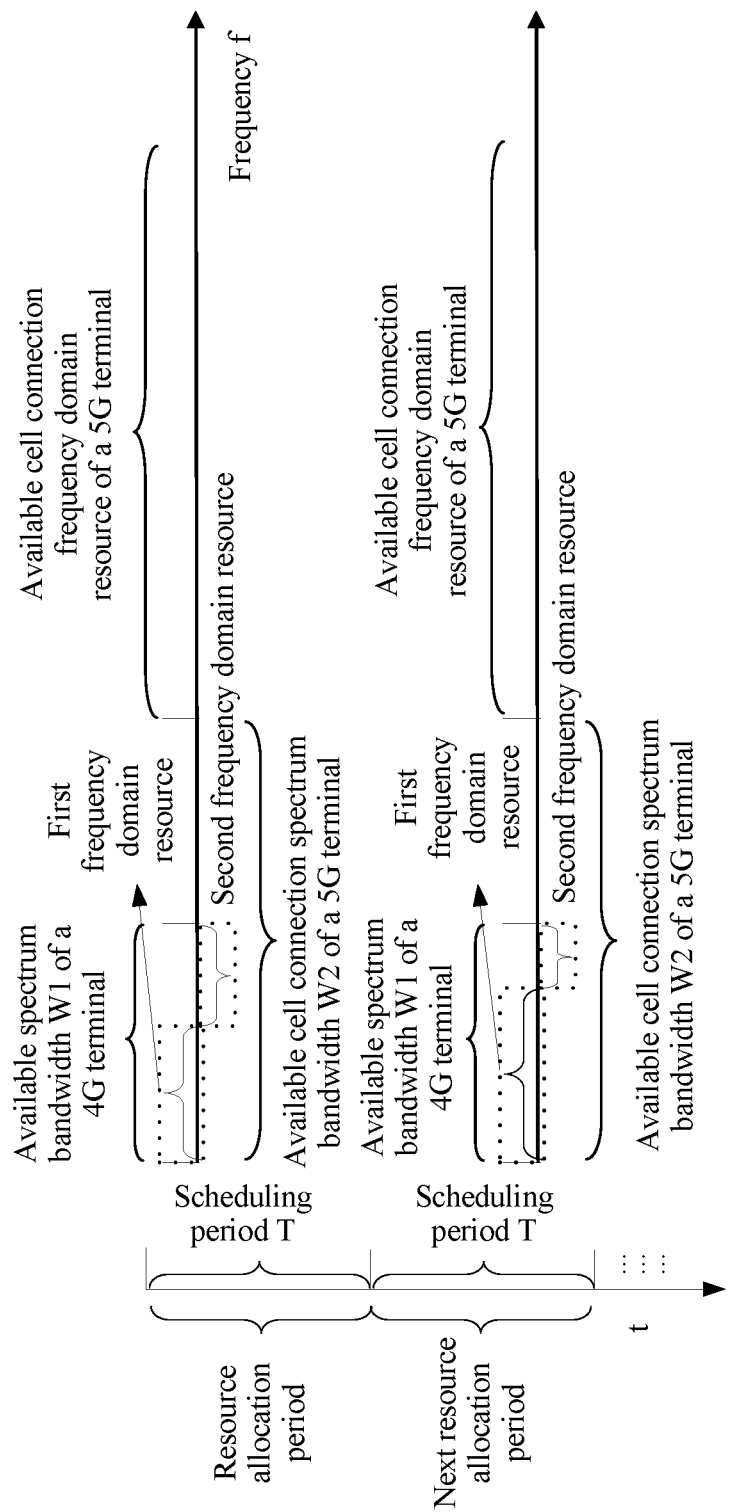
FIG. 10 is a schematic diagram of dynamic allocation of a frequency domain resource according to an embodiment.

It should be understood that the resource allocation period may alternatively include one scheduling period. In this case, the base station determines the first frequency domain resource and the second frequency domain resource based on the network parameter in each scheduling period. Specifically, a schematic diagram of frequency domain resource allocation is shown in FIG. 10. It can be learned from the figure that the base station may re-determine the first frequency domain resource and the second frequency domain resource based on the network parameter in each resource allocation period, namely, in each scheduling period, and the terminals in two different RATs may transmit data based on the frequency domain resources allocated by the base station in each scheduling period.

Figure 11:
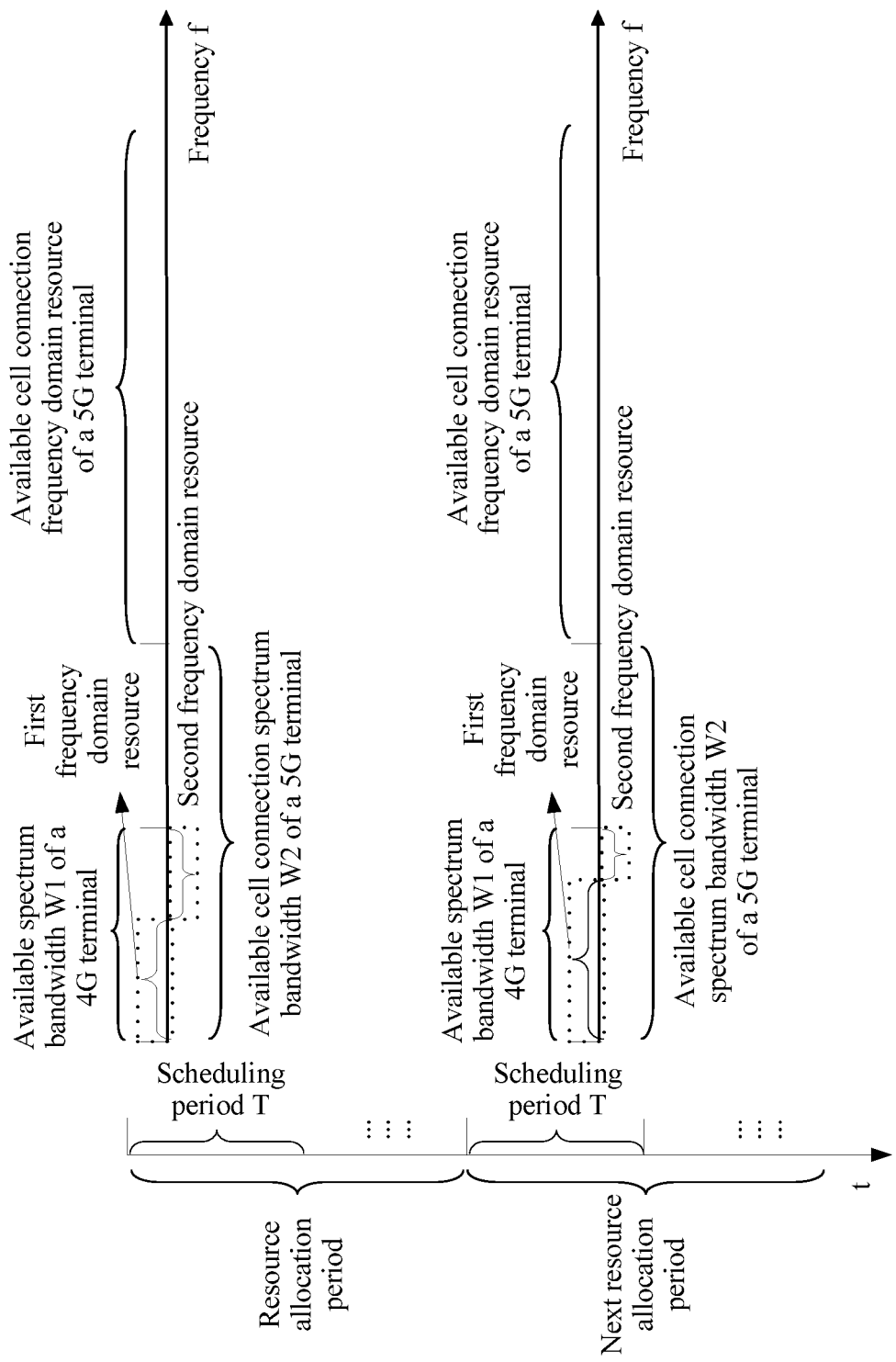
FIG. 11 is a schematic diagram of semi-static allocation of a frequency domain resource according to an embodiment.

It should be further understood that the resource allocation period may include a plurality of scheduling periods. In each scheduling period T in a resource allocation period, the terminals in two different RATs may transmit data based on the frequency domain resources allocated by the base station. In a next resource allocation period, the base station re-determines the first frequency domain resource and the second frequency domain resource from the target frequency domain resource based on the network parameter. Specifically, a schematic diagram of frequency domain resource allocation is shown in FIG. 11. It can be learned from FIG. 11 that each resource allocation period may include a plurality of scheduling periods. In each resource allocation period, the base station performs frequency domain resource allocation once. In a next resource allocation period, the base station may re-determine the first frequency domain resource and the second frequency domain resource based on the network parameter.

It should be further understood that the base station may select the first frequency domain resource for the 4G terminal based on the network parameter, and select the second frequency domain resource for the 5G terminal based on the network parameter. The first frequency domain resource and the second frequency domain resource may be consecutive frequency domain resources or inconsecutive frequency domain resources.

The foregoing describes in detail the method in which the base station selects, from the target time domain resource based on the network parameter, the first time domain resource used by the 4G terminal and the second time domain resource used by the 5G terminal, and the method in which the base station selects, from the target frequency domain resource based on the network parameter, the first frequency domain resource used by the 4G terminal and the second frequency domain resource used by the 5G terminal. The following describes in detail a method in which the base station selects, from a target time-frequency resource based on the network parameter, a first time-frequency resource used by the 4G terminal and a second time-frequency resource used by the 5G terminal.

Specifically, in this embodiment, that the base station selects, from a time-frequency resource shared by the 4G terminal and the 5G terminal, a first time-frequency resource used by the 4G terminal and a second time-frequency resource used by the 5G terminal may include the following steps:

(1) The base station may obtain the following network parameters: a quantity M of resources required by the 4G terminal, a quantity N of resources required by the 5G terminal, a total quantity S1 of time-frequency resources of the 4G terminal, and a total quantity S2 of time-frequency resources of the 5G terminal.

Figure 12:
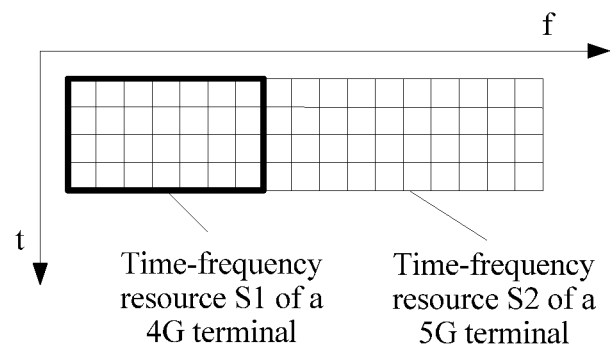
FIG. 12 is a schematic diagram of time-frequency resources used by a 4G terminal and a 5G terminal in the prior art.

It should be understood that in this embodiment, as a forward-compatible terminal, the 5G terminal may use the total quantity S1 of time-frequency resources of the 4G terminal, in other words, S1 may be the time-frequency resource shared by the 4G terminal and the 5G terminal. FIG. 12 is a schematic diagram of time-frequency resources that can be used by a 4G terminal and a 5G terminal. It can be learned from the figure that the time-frequency resource S2 available to the 5G terminal may include the total quantity S1 of time-frequency resources of the 4G terminal. In addition, the time-frequency resource S2 available to the 5G terminal further includes some time-frequency resources dedicated to the 5G terminal.

(2) After obtaining the network parameters in step (1), the base station calculates, based on the network parameters, a time-frequency resource R1 required by the 4G terminal and a time-frequency resource R2 required by the 5G terminal.

In specific implementation, time-frequency resources required by the 4G terminal and the 5G terminal may be obtained through calculation according to the following formulas:

$$R1 = \frac{S2 * M}{M + N} \quad (7)$$

-continued $$R2 = \frac{S2*N}{M+N} \quad (8)$$

Specifically, a time-frequency resource allocation manner is described as follows:

When R1 is greater than or equal to S1, in this case, a quantity of required time-frequency resources of the 4G terminal in a network is relatively large, and all the time-frequency resources S1 shared by the 4G terminal and the 5G terminal may be determined as the first time-frequency resource, in other words, all of the total quantity of time-frequency resources of the 4G terminal are determined as the first time-frequency resource. In this case, the second time-frequency resource is null, in other words, all the time-frequency resources shared by the 4G terminal and the 5G terminal are allocated to the 4G terminal for use. In this case, the time-frequency resource R2 available to the 5G terminal may be a remaining time-frequency resource in the time-frequency resource S2 available to the 5G terminal other than the time-frequency resource S1 available to the 4G terminal.

When R1 is less than S1, the base station may determine R1 as the first time-frequency resource used by the 4G terminal, and determine, as the second time-frequency resource, a time-frequency resource in the time-frequency resource S1 shared by the 4G terminal and the 5G terminal other than R1. In this case, a time-frequency resource available to the 5G terminal may be a remaining time-frequency resource in the time-frequency resource S2 available to the 5G terminal other than the time-frequency resource R1 available to the 4G terminal, namely, the time-frequency resource R2.

It should be understood that the foregoing method in which the base station selects, based on calculation results of the formulas (7) and (8), the first time-frequency resource used by the 4G terminal and the second time-frequency resource used by the 5G terminal is merely an example for description. This embodiment is not limited thereto. For example, in this embodiment, the base station may alternatively select, based on calculation results of formulas (9) and (10), the first time-frequency resource used by the 4G terminal and the second time-frequency resource used by the 5G terminal:

$$R1' = \frac{S1*M}{M+N} \quad (9)$$

$$R2' = \frac{S1*N}{M+N} \quad (10)$$

The base station obtains, through calculation by using the formulas (9) and (10), a time-frequency resource R1' required by the 4G terminal and a time-frequency resource R2' required by the 5G terminal. A sum of R1' and R2' is the time-frequency resource S1 shared by the 4G terminal and the 5G terminal. Therefore, the base station may determine R1' as the first time-frequency resource, and determine R2' as the second time-frequency resource. In this case, the time-frequency resource available to the 4G terminal is R1', and the time-frequency resource available to the 5G terminal may be a time-frequency resource in S2 other than R1' used by the 4G terminal.

Optionally, in some embodiments, as described above, the target resource may be a resource in a resource allocation period.

Figure 13:
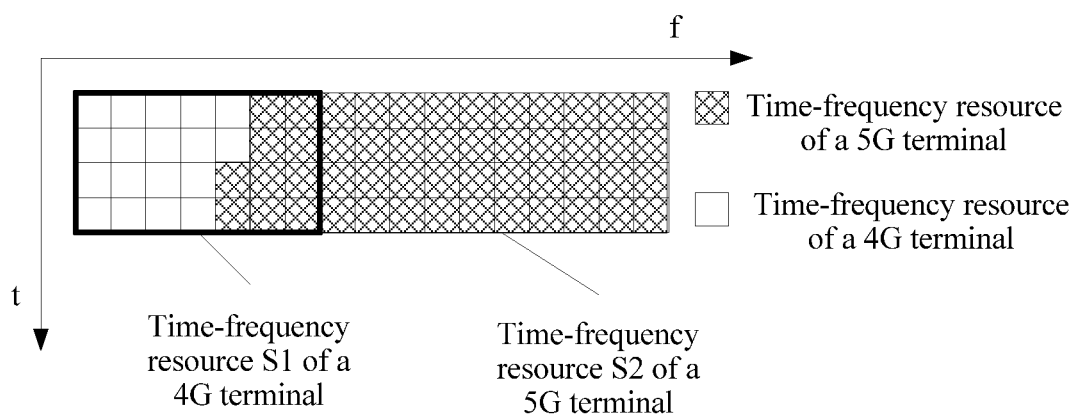
FIG. 13 is a schematic diagram of static allocation of a time-frequency resource according to an embodiment.

Specifically, in this embodiment, the base station may perform resource allocation once in each resource allocation period. When the resource allocation period may include an infinite quantity of scheduling periods T, in other words, allocation performed by the base station on the shared time-frequency resource is static allocation, the base station performs time-frequency resource allocation only once. Specifically, a schematic diagram of time-frequency resource allocation is shown in FIG. 13. It can be learned from the figure that the base station determines the first time-frequency resource and the second time-frequency resource based on the network parameter, and in each subsequent scheduling period T, both the terminals in two different RATs may transmit data based on the time-frequency resources allocated by the base station.

Figure 14:
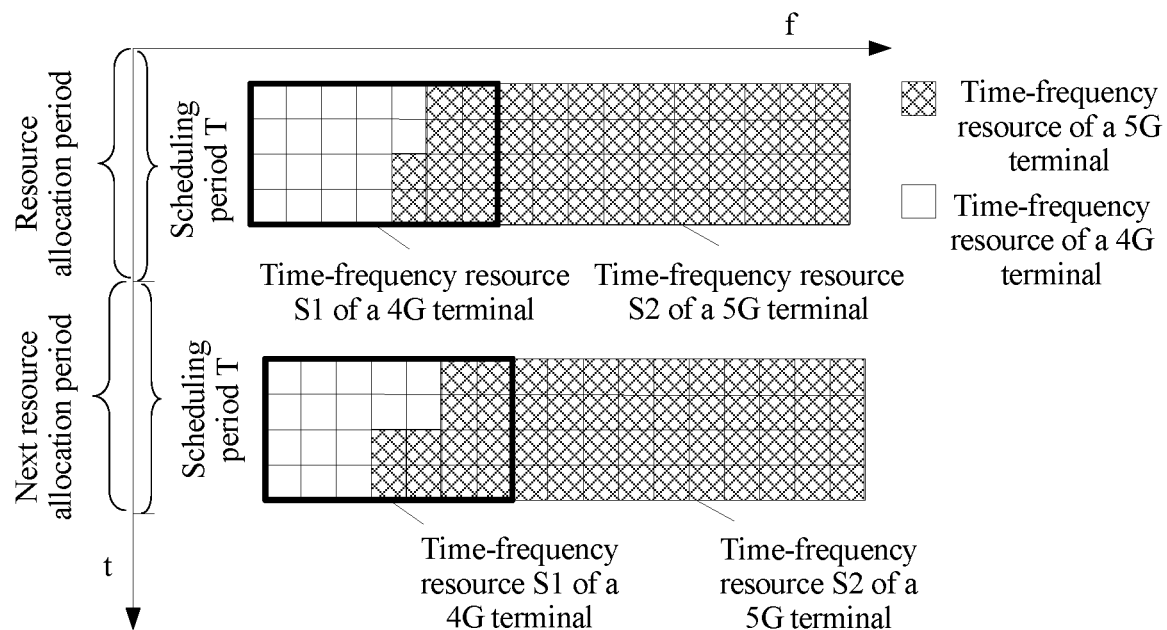
FIG. 14 is a schematic diagram of dynamic allocation of a time-frequency resource according to an embodiment.

It should be understood that the resource allocation period may alternatively include one scheduling period T. In this case, the base station re-determines the first time-frequency resource and the second time-frequency resource based on the network parameter in each scheduling period T. Specifically, a schematic diagram of time-frequency resource allocation is shown in FIG. 14. It can be learned from the figure that the base station may perform time-frequency resource allocation once in each resource allocation period, namely, in each scheduling period T, and the terminals in two different RATs may transmit data based on the time-frequency resources selected by the base station in the scheduling period.

Figure 15:
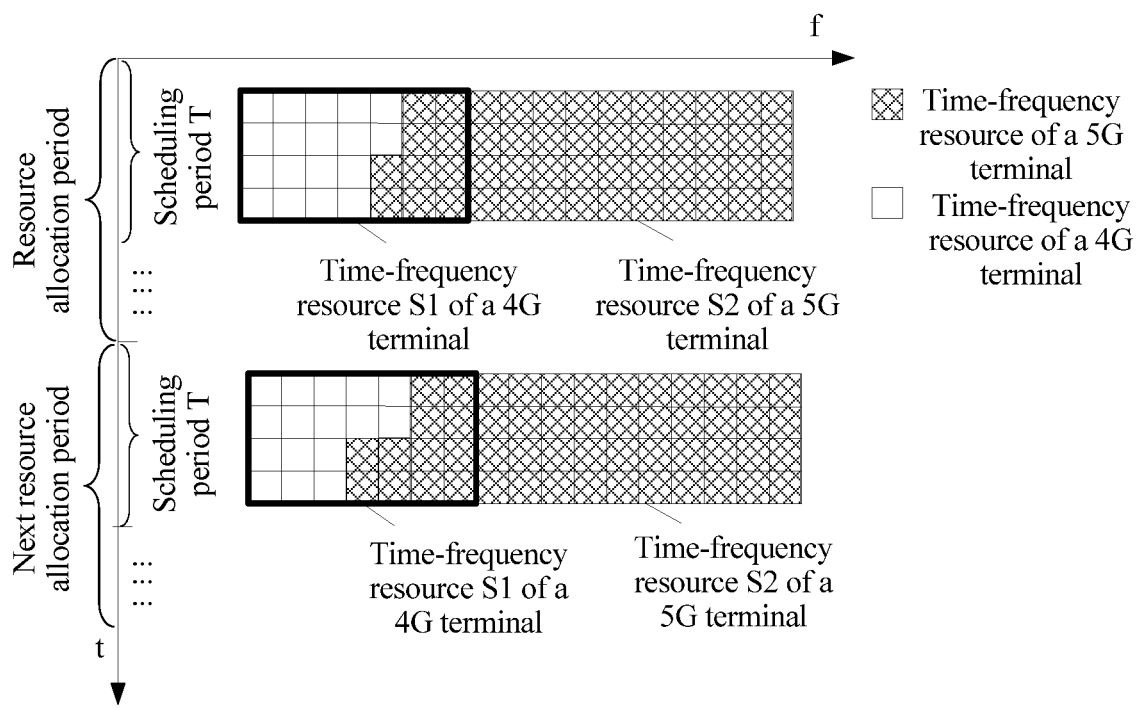
FIG. 15 is a schematic diagram of semi-static allocation of a time-frequency resource according to an embodiment.

It should be further understood that the resource allocation period may include a plurality of scheduling periods T. In each scheduling period in a resource allocation period, the terminals in two different RATs may transmit data based on the time-frequency resources allocated by the base station in the resource allocation period. In a next resource allocation period, the base station may re-determine the first time-frequency resource and the second time-frequency resource from the target time-frequency resource based on the network parameter. Specifically, a schematic diagram of time-frequency resource allocation is shown in FIG. 15. It can be learned from the figure that the resource allocation period may include a plurality of scheduling periods. In each resource allocation period, the base station performs time-frequency resource allocation once. In a next resource allocation period, the base station may re-determine the first time-frequency resource and the second time-frequency resource based on the network parameter.

It should be further understood that the base station may allocate the first time-frequency resource to the 4G terminal based on the network parameter, and allocate the second time-frequency resource to the 5G terminal based on the network parameter. The first time-frequency resource and the second time-frequency resource may be consecutive time-frequency resources or inconsecutive time-frequency resources.

Optionally, in some embodiments, the base station may select the first resource and the second resource from the target resource based on the network parameter in a plurality of other manners. In another implementation, the selecting, by the base station, the first resource and the second resource from the target resource based on the network parameter may further include:

determining, by the base station, a third resource pre-allocated to the terminal in the first RAT and a fourth resource pre-allocated to the terminal in the second RAT, where the target resource includes the third resource, the fourth resource, and a remaining resource other than the third resource and the fourth resource; and dividing the remaining resource based on the network parameter, to determine the first resource and the second resource, where the first resource includes the third resource, the second resource includes the fourth resource, and a sum of the first resource and the second resource includes the remaining resource.

Optionally, in some embodiments, the base station may divide the remaining resource based on the network parameter in a plurality of manners, to determine the first resource and the second resource. In an implementation, the dividing, by the base station, the remaining resource based on the network parameter, to determine the first resource and the second resource may include:

determining, by the base station based on the network parameter, a first reference resource required by the terminal in the first RAT; and when the first reference resource is less than the third resource, determining, by the base station, the third resource as the first resource, and determining the fourth resource and the remaining resource as the second resource; or when the first reference resource is greater than a sum of the third resource and the remaining resource, determining, by the base station, the sum of the third resource and the remaining resource as the first resource, and determining the fourth resource as the second resource; or when the first reference resource is greater than the third resource, and is less than a sum of the third resource and the remaining resource, determining, by the base station, the first reference resource as the first resource, and determining a resource in the shared resource other than the first reference resource as the second resource.

It should be understood that in this embodiment, the first reference resource may be a resource pre-determined by the base station for the terminal in the first RAT based on the network parameter.

Specifically, as described above, the resource shared by the terminal in the first RAT and the terminal in the second RAT may be a time domain resource, a frequency domain resource, or a time-frequency resource. The terminal in the first RAT may be a 4G terminal, and the terminal in the second RAT may be a 5G terminal. The following separately describes, in detail by using an example in which the terminal in the first RAT may be the 4G terminal and the terminal in the second RAT may be the 5G terminal from a perspective that the shared resource is the time domain resource, a perspective that the shared resource is the frequency domain resource, and a perspective that the shared resource is the time-frequency resource, a method in which the base station divides the remaining resource based on the network parameter, to determine the first resource and the second resource in this embodiment.

Specifically, when the target resource is a time domain resource shared by the 4G terminal and the 5G terminal, the base station may obtain a third time domain resource pre-allocated to the 4G terminal and a fourth time domain resource pre-allocated to the 5G terminal. The base station may divide a remaining time domain resource in the target time domain resource other than the third time domain resource and the fourth time domain resource based on the quantity M of resources required by the 4G terminal, the available cell connection spectrum bandwidth W1 occupied by the 4G terminal, the quantity N of resources required by the 5G terminal, and the available cell connection spectrum bandwidth W2 occupied by the 5G terminal. For ease of understanding, herein, the third time domain resource pre-allocated by the base station to the 4G terminal is denoted as T3, the fourth time domain resource pre-allocated by the base station to the 5G terminal is denoted as T4, and the remaining time domain resource in the time domain resource shared by the 4G terminal and the 5G terminal other than T3 and T4 is denoted as Tp.

Based on the foregoing network parameters, the base station may obtain, through calculation according to the formulas (1) and (2), a first reference transmission time T1 required by the 4G terminal and a second reference transmission time T2 required by the 5G terminal in a scheduling period T.

Optionally, in this embodiment, the base station may select the first reference transmission time T1 of the 4G terminal that is obtained through calculation to divide the remaining resource.

Specifically, when T1 is less than or equal to T3, in other words, the first reference transmission time T1 of the 4G terminal that is obtained by the base station through calculation is less than or equal to the time domain resource T3 pre-allocated by the base station to the 4G terminal from the target time domain resource, the base station may determine the time domain resource T3 pre-allocated to the 4G terminal as the first time domain resource, and determine the remaining time domain resource Tp and the time domain resource T4 pre-allocated to the 5G terminal as the second time domain resource. In this case, the base station may allocate all remaining time domain resources in the shared time domain resource to the 5G terminal for use.

When T1 is greater than or equal to a sum of T3 and Tp, in other words, the first reference transmission time T1 of the 4G terminal that is obtained by the base station through calculation is greater than or equal to a sum of the time domain resource T3 pre-allocated by the base station to the 4G terminal and the remaining time domain resource Tp, the base station may determine the time domain resource T3 pre-allocated to the 4G terminal and the remaining time domain resource Tp as the first time domain resource, and determine the time domain resource T4 pre-allocated to the 5G terminal as the second time domain resource. In this case, the base station may allocate all remaining time domain resources in the shared time domain resource to the 4G terminal for use.

When T1 is greater than T3, and is less than a sum of T3 and Tp, in other words, the first reference transmission time T1 of the 4G terminal that is obtained by the base station through calculation is greater than the time domain resource T3 pre-allocated by the base station to the 4G terminal, and is less than a sum of the time domain resource T3 pre-allocated by the base station to the 4G terminal and the remaining time domain resource Tp, the base station may determine the first reference transmission time T1 obtained through calculation as the first time domain resource, and determine the second reference transmission time T2 as the second time domain resource.

Optionally, in this embodiment, the base station may alternatively select the second reference transmission time T2 of the 5G terminal that is obtained through calculation to divide the remaining resource. For a specific division method, refer to a process of dividing the remaining resource by using the first reference transmission time T1 of the 4G terminal. For brevity of the application, details are not described herein.

Optionally, in an embodiment, as described above, the target resource may be a resource in a resource allocation period. Specifically, the target resource may be a time domain resource in the resource allocation period.

Figure 16:
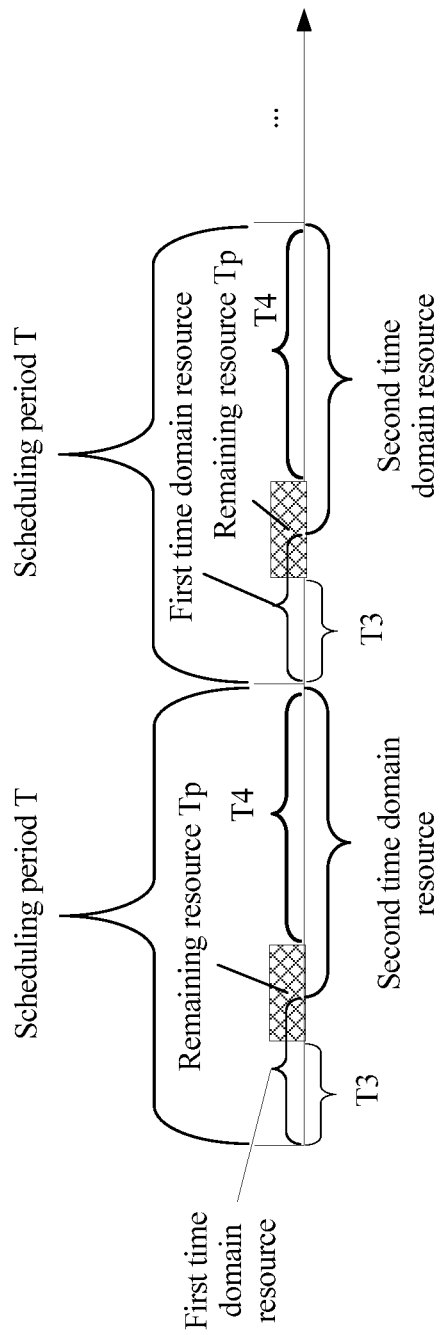
FIG. 16 is a schematic diagram of static allocation of a time domain resource according to another embodiment.

Specifically, in this embodiment, the base station may perform resource allocation for the 4G terminal and the 5G terminal once in each resource allocation period. When the resource allocation period may include an infinite quantity of scheduling periods T, in other words, allocation performed by the base station on the remaining time domain resource is static allocation, the base station divides the remaining time domain resource based on the network parameter, to determine the first time domain resource and the second time domain resource. Specifically, a schematic diagram of time domain resource allocation is shown in FIG. 16. It can be learned from the figure that the base station divides the remaining time domain resource only once based on the network parameter, and in each subsequent scheduling period T, both the terminals in two different RATs may transmit data based on the time domain resources allocated by the base station.

Figure 17:
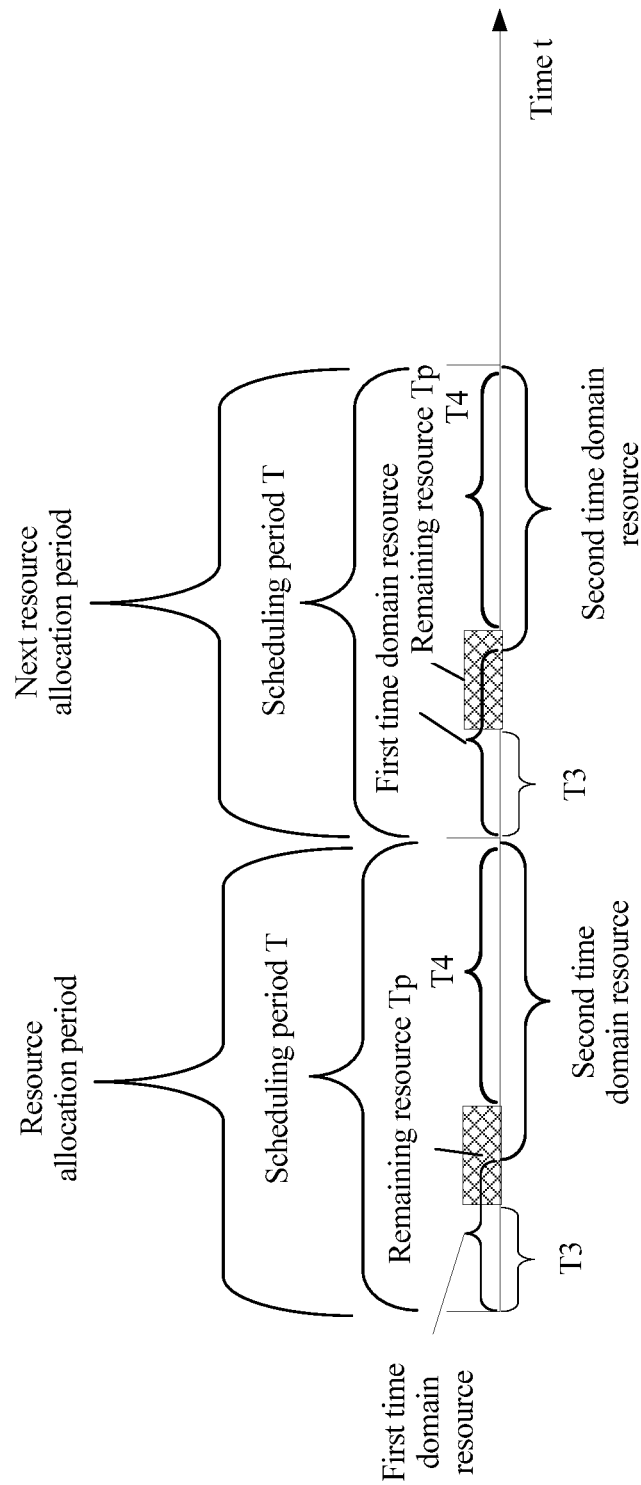
FIG. 17 is a schematic diagram of dynamic allocation of a time domain resource according to another embodiment.

It should be understood that the resource allocation period may alternatively include one scheduling period. In this case, the base station divides the remaining time domain resource based on the network parameter in each scheduling period, to determine the first time domain resource and the second time domain resource. Specifically, a schematic diagram of time domain resource allocation is shown in FIG. 17. It can be learned from FIG. 17 that the base station may divide the remaining time domain resource based on the network parameter in each resource allocation period, namely, in each scheduling period, and the terminals in two different RATs may transmit data based on the time domain resources allocated by the base station in the resource allocation period.

Figure 18:
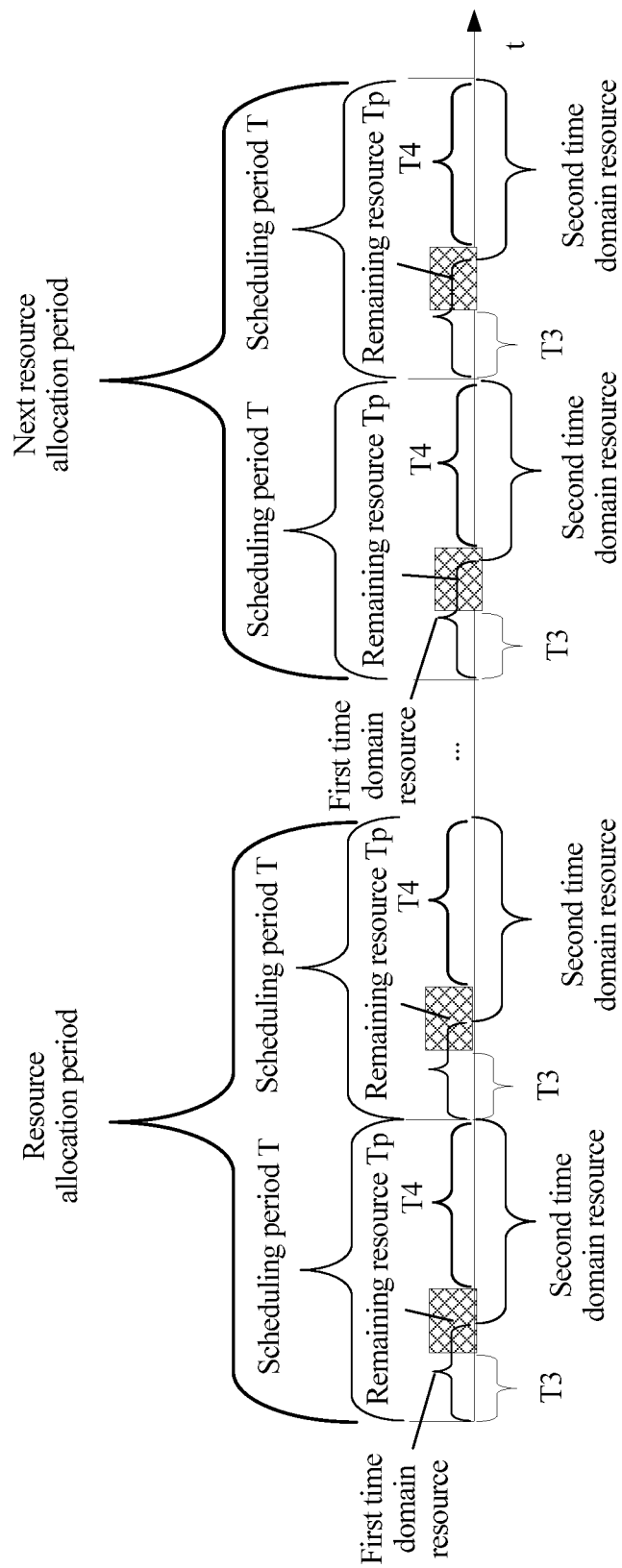
FIG. 18 is a schematic diagram of semi-static allocation of a time domain resource according to another embodiment.

It should be further understood that the resource allocation period may include a plurality of scheduling periods. In each scheduling period in a resource allocation period, the terminals in two different RATs may transmit data based on the time domain resources allocated by the base station. In a next resource allocation period, the base station re-divides the remaining time domain resource based on the network parameter, to determine the first time domain resource for the 4G terminal from the target resource, and determine the second time domain resource for the 5G terminal from the target resource. Specifically, a schematic diagram of time domain resource allocation is shown in FIG. 18. It should be understood that FIG. 18 shows only a case in which the resource allocation period includes two scheduling periods T, but this embodiment is not limited thereto.

It should be further understood that the base station may divide the remaining time domain resource based on the network parameter, to determine the first time domain resource and the second time domain resource. The first time domain resource and the second time domain resource may be consecutive time domain resources or inconsecutive time domain resources.

The foregoing describes in detail the method in which the base station divides the remaining time domain resource based on the network parameter, to determine the first time domain resource used by the 4G terminal and the second time domain resource used by the 5G terminal. The following describes in detail a method in which when the target resource is a frequency domain resource, the base station divides a remaining frequency domain resource based on the network parameter, to determine a first frequency domain resource used by the 4G terminal and a second frequency domain resource used by the 5G terminal.

Specifically, in this embodiment, the base station may pre-allocate a third frequency domain resource to the 4G terminal, and pre-allocate a fourth frequency domain resource to the 5G terminal. The base station may divide a remaining frequency domain resource in the target frequency domain resource other than the third frequency domain resource and the fourth frequency domain resource based on the quantity M of resources required by the 4G terminal, the available cell connection spectrum bandwidth W1 occupied by the 4G terminal, the quantity N of resources required by the 5G terminal, and the available cell connection spectrum bandwidth W2 occupied by the 5G terminal. For ease of understanding, herein, the third frequency domain resource pre-allocated by the base station to the 4G terminal is denoted as W3, the fourth frequency domain resource pre-allocated by the base station to the 5G terminal is denoted as W4, and the remaining frequency domain resource in the frequency domain resource shared by the 4G terminal and the 5G terminal other than W3 and W4 is denoted as Wp.

It should be understood that in this embodiment, the base station pre-allocates the third frequency domain resource to the 4G terminal from the frequency domain resource shared by the 4G terminal and the 5G terminal, where the third frequency domain resource may be null, and pre-allocates the fourth frequency domain resource to the 5G terminal from the frequency domain resource shared by the 4G terminal and the 5G terminal, where the fourth frequency domain resource may also be null. In other words, in the frequency domain resource shared by the 4G terminal and the 5G terminal, the base station may pre-allocate no frequency domain resource to the 5G terminal, or may pre-allocate no frequency domain resource to the 4G terminal.

Based on the foregoing network parameters, the base station may obtain, through calculation according to the formulas (3) and (4), a first reference frequency domain resource B1 required by the 4G terminal and a second reference frequency domain resource B2 required by the 5G terminal in a scheduling period.

Specifically, in this embodiment, the base station may divide the remaining frequency domain resource in the shared frequency domain resource based on the first reference frequency domain resource B1 obtained through calculation.

When B1 is less than or equal to W3, in other words, the first reference frequency domain resource B1 of the 4G terminal that is obtained by the base station through calculation is less than or equal to the third frequency domain resource W3 pre-allocated by the base station to the 4G terminal from the target frequency domain resource, the base station may determine the frequency domain resource W3 pre-allocated to the 4G terminal as the first frequency domain resource, and determine the remaining frequency domain resource Wp and the time domain resource W4 pre-allocated to the 5G terminal as the second frequency domain resource. In this case, the base station may allocate all remaining frequency domain resources in the shared frequency domain resource to the 5G terminal for use.

When B1 is greater than or equal to a sum of W3 and Wp, in other words, the first reference frequency domain resource B1 of the 4G terminal that is obtained by the base station through calculation is greater than or equal to a sum of the third frequency domain resource W3 pre-allocated by the base station to the 4G terminal and the remaining frequency domain resource Wp, the base station may determine the third frequency domain resource W3 pre-allocated to the 4G terminal and the remaining frequency domain resource Wp as the first frequency domain resource, and determine the fourth frequency domain resource W4 pre-allocated to the 5G terminal as the second frequency domain resource.

When B1 is greater than W3, and is less than a sum of W3 and Wp, in other words, the first reference frequency domain resource B1 of the 4G terminal that is obtained by the base station through calculation is greater than the third frequency domain resource W3 pre-allocated by the base station to the 4G terminal, and is less than a sum of the third frequency domain resource W3 pre-allocated by the base station to the 4G terminal and the remaining frequency domain resource Wp, the base station may determine the first reference frequency domain resource B1 obtained through calculation as the first frequency domain resource, and determine a frequency domain resource in the frequency domain resource shared by the 4G terminal and the 5G terminal other than B1 as the second frequency domain resource.

It should be understood that the foregoing method in which the base station divides the remaining frequency domain resource based on calculation results of the formulas (3) and (4), to determine the first frequency domain resource used by the 4G terminal and the second frequency domain resource used by the 5G terminal is merely an implementation in this embodiment. This embodiment is not limited thereto. For example, in this embodiment, the base station may alternatively divide the remaining frequency domain resource based on calculation results of the formulas (5) and (6), to determine the first frequency domain resource used by the 4G terminal and the second frequency domain resource used by the 5G terminal. For a specific division method, refer to the method for dividing the remaining frequency domain resource based on the calculation results of the formulas (3) and (4). For brevity of the application, details are not described herein.

Optionally, in an embodiment, as described above, the target resource may be a resource in a resource allocation period. Specifically, the target resource may be a frequency domain resource in the resource allocation period.

Figure 19:
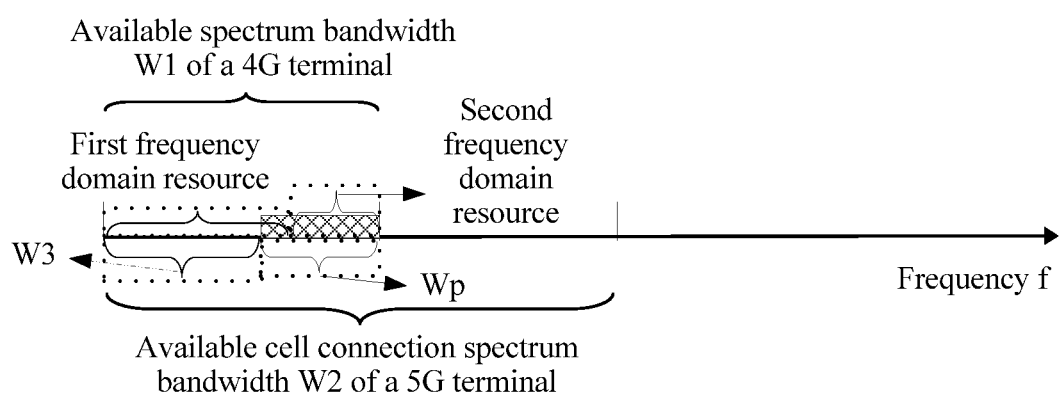
FIG. 19 is a schematic diagram of static allocation of a frequency domain resource according to another embodiment.

Specifically, in this embodiment, the base station may perform resource allocation for the 4G terminal and the 5G terminal once in each resource allocation period. When the resource allocation period may include an infinite quantity of scheduling periods T, in other words, allocation performed by the base station on the remaining frequency domain resource is static allocation, the base station divides the remaining frequency domain resource based on the network parameter, to determine the first frequency domain resource and the second frequency domain resource. Specifically, a schematic diagram of frequency domain resource allocation is shown in FIG. 19. It can be learned from the figure that the base station divides the remaining time domain resource only once based on the network parameter, and in each subsequent scheduling period T, both the terminals in two different RATs transmit data based on the frequency domain resources allocated by the base station. It should be understood that FIG. 19 shows only a case in which the fourth frequency domain resource W4 pre-allocated by the base station to the 5G terminal is null in this embodiment, but the embodiment is not limited thereto.

Figure 20:
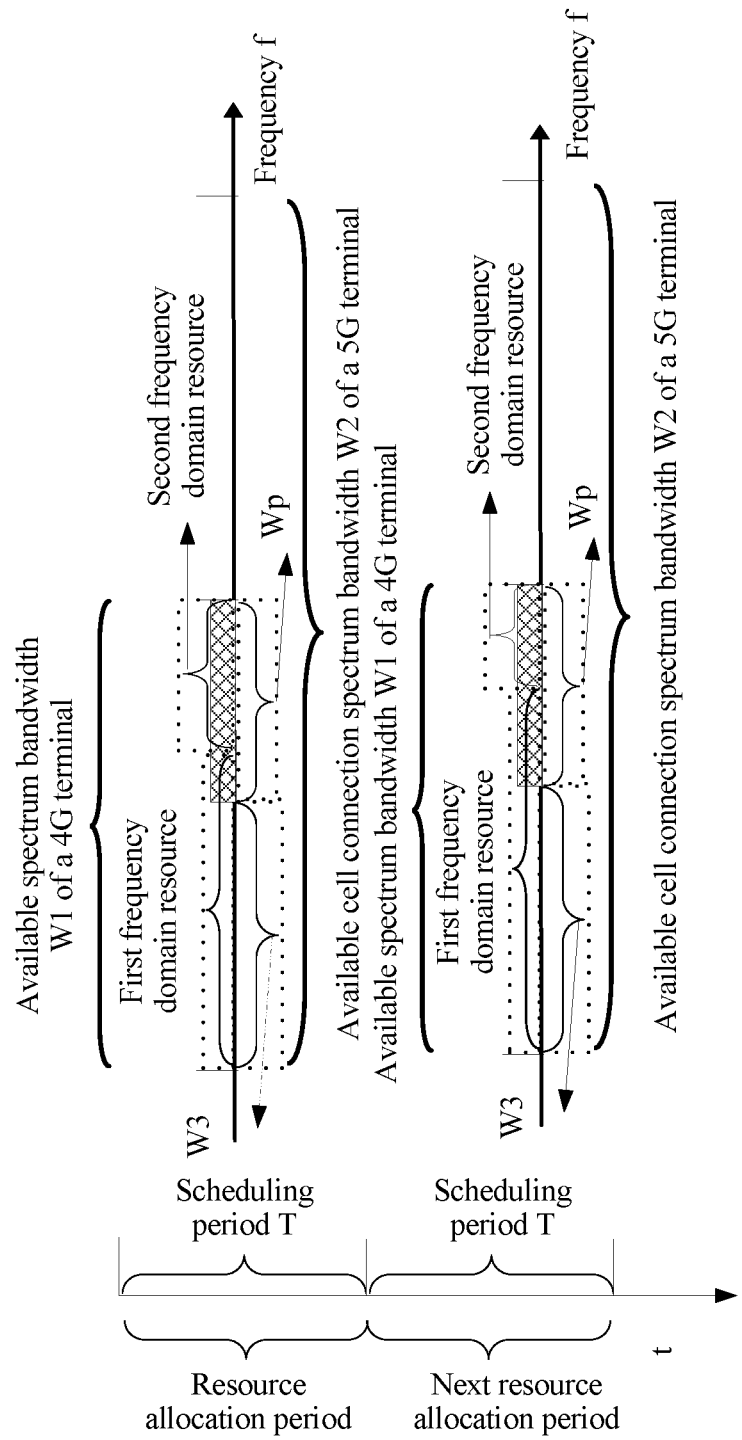
FIG. 20 is a schematic diagram of dynamic allocation of a frequency domain resource according to another embodiment.

It should be understood that the resource allocation period may alternatively include one scheduling period T. In this case, the base station divides the remaining time domain resource based on the network parameter in each scheduling period, to determine the first frequency domain resource and the second frequency domain resource. Specifically, a schematic diagram of frequency domain resource allocation is shown in FIG. 20. It can be learned from the figure that the base station may divide the remaining frequency domain resource based on the network parameter in each resource allocation period, namely, in each scheduling period, and the terminals in two different RATs may transmit data based on the frequency domain resources allocated by the base station in the scheduling period. It should be understood that FIG. 20 shows only a case in which the fourth frequency domain resource W4 pre-allocated by the base station to the 5G terminal is null in this embodiment, but the embodiment is not limited thereto.

Figure 21:
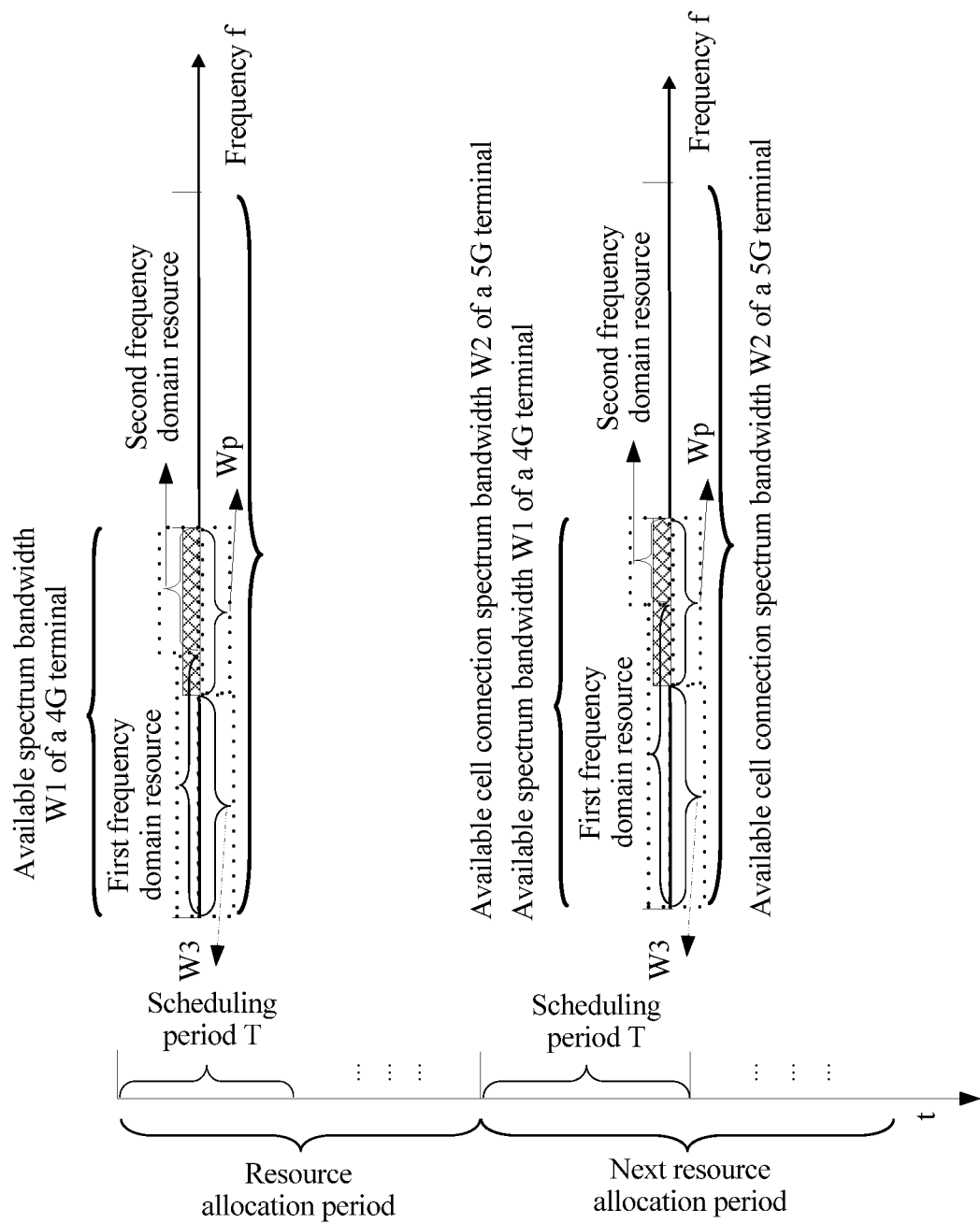
FIG. 21 is a schematic diagram of semi-static allocation of a frequency domain resource according to another embodiment.

It should be further understood that the resource allocation period may include a plurality of scheduling periods. In each scheduling period in a resource allocation period, the terminals in two different RATs may transmit data based on the frequency domain resources allocated by the base station. In a next resource allocation period, the base station re-divides the remaining frequency domain frequency domain resource based on the network parameter, to determine the first frequency domain resource and the second frequency domain resource from the target frequency domain resource. Specifically, a schematic diagram of frequency domain resource allocation is shown in FIG. 21. It should be understood that FIG. 21 shows only a case in which the fourth frequency domain resource W4 pre-allocated by the base station to the 5G terminal is null in this embodiment, but the embodiment is not limited thereto.

It should be further understood that the base station may allocate the first frequency domain resource to the 4G terminal based on the network parameter, and allocate the second frequency domain resource to the 5G terminal based on the network parameter. The first frequency domain resource and the second frequency domain resource may be consecutive frequency domain resources or inconsecutive frequency domain resources.

It should be further understood that in this embodiment, spectrum bandwidth available to the 4G terminal may be the frequency domain resource that can be shared by the 4G terminal and the 5G terminal.

The foregoing describes in detail the method in which the base station divides the remaining frequency domain resource in the target frequency domain resource based on the network parameter, to determine the first frequency domain resource used by the 4G terminal and the second frequency domain resource used by the 5G terminal. The following describes in detail a method in which when the target resource is a time-frequency resource, the base station divides a remaining time-frequency resource based on the network parameter, to determine a first time-frequency resource used by the 4G terminal and a second time-frequency resource used by the 5G terminal.

Specifically, in this embodiment, the base station may pre-allocate a third time-frequency resource to the 4G terminal, and pre-allocate a fourth time-frequency resource to the 5G terminal. The base station may divide a remaining time-frequency resource in the target time-frequency resource other than the third time-frequency resource and the fourth time-frequency resource based on the quantity M of resources required by the 4G terminal, the quantity N of resources required by the 5G terminal, the total quantity S1 of time-frequency resources of the 4G terminal, and the total quantity S2 of time-frequency resources of the 5G terminal. For ease of understanding, herein, the third time-frequency resource pre-allocated by the base station to the 4G terminal may be denoted as S3, the fourth time-frequency resource pre-allocated by the base station to the 5G terminal may be denoted as S4, and the remaining time-frequency resource in the time-frequency resource shared by the 4G terminal and the 5G terminal other than S3 and S4 may be denoted as Sp.

It should be understood that in this embodiment, the base station pre-allocates the third time-frequency resource to the 4G terminal from the time-frequency resource shared by the 4G terminal and the 5G terminal, where the third time-frequency resource may be null, and pre-allocates the fourth time-frequency resource to the 5G terminal from the time-frequency resource shared by the 4G terminal and the 5G terminal, where the fourth time-frequency resource may also be null. In other words, in the time-frequency resource shared by the 4G terminal and the 5G terminal, the base station may pre-allocate no time-frequency resource to the 5G terminal, or may pre-allocate no time-frequency resource to the 4G terminal.

Based on the foregoing network parameters, the base station may obtain, through calculation according to the formulas (7) and (8), a first reference time-frequency resource R1 required by the 4G terminal and a second reference time-frequency resource R2 required by the 5G terminal in a scheduling period.

Specifically, in this embodiment, the base station may divide the remaining time-frequency resource in the shared time-frequency resource based on the first reference time-frequency resource R1 obtained through calculation.

When R1 is less than or equal to S3, in other words, the first reference time-frequency resource R1 of the 4G terminal that is obtained by the base station through calculation is less than or equal to the time-frequency resource S3 pre-allocated by the base station to the 4G terminal from the target time-frequency resource, the base station may determine the time-frequency resource S3 pre-allocated to the 4G terminal as the first time-frequency resource, and determine the remaining time-frequency resource Sp and the time-frequency resource S4 pre-allocated to the 5G terminal as the second time-frequency resource. In this case, the base station may allocate all remaining time-frequency resources in the shared time-frequency resource to the 5G terminal for use.

When R1 is greater than or equal to a sum of S3 and Sp, in other words, the first reference time-frequency resource R1 of the 4G terminal that is obtained by the base station through calculation is greater than or equal to a sum of the time-frequency resource S3 pre-allocated by the base station to the 4G terminal and the remaining time-frequency resource Sp, the base station may determine the time-frequency resource S3 pre-allocated to the 4G terminal and the remaining time-frequency resource Sp as the first time-frequency resource, and determine the time-frequency resource S4 pre-allocated to the 5G terminal as the second time-frequency resource.

When R1 is greater than S3, and is less than a sum of S3 and Sp, in other words, the first reference time-frequency resource R1 of the 4G terminal that is obtained by the base station through calculation is greater than the time-frequency resource S3 pre-allocated by the base station to the 4G terminal, and is less than a sum of the time-frequency resource S3 pre-allocated by the base station to the 4G terminal and the remaining time-frequency resource Sp, the base station may determine the first reference time-frequency resource R1 obtained through calculation as the first time-frequency resource, and determine a time-frequency resource in the time-frequency resource shared by the 4G terminal and the 5G terminal other than R1 as the second time-frequency resource.

It should be understood that the foregoing method in which the base station divides the remaining time-frequency resource based on calculation results of the formulas (7) and (8), to determine the first time-frequency resource used by the 4G terminal and the second time-frequency resource used by the 5G terminal is merely an implementation in this embodiment. This embodiment is not limited thereto. For example, in this embodiment, the base station may alternatively divide the remaining time-frequency resource based on calculation results of the formulas (9) and (10), to determine the first time-frequency resource used by the 4G terminal and the second time-frequency resource used by the 5G terminal. For a specific division method, refer to the method for dividing the remaining time-frequency resource based on the calculation results of the formulas (7) and (8). For brevity of the application, details are not described herein.

Optionally, in an embodiment, as described above, the target resource may be a resource in a resource allocation period. Specifically, the target resource may be a time-frequency resource in the resource allocation period.

Figure 22:
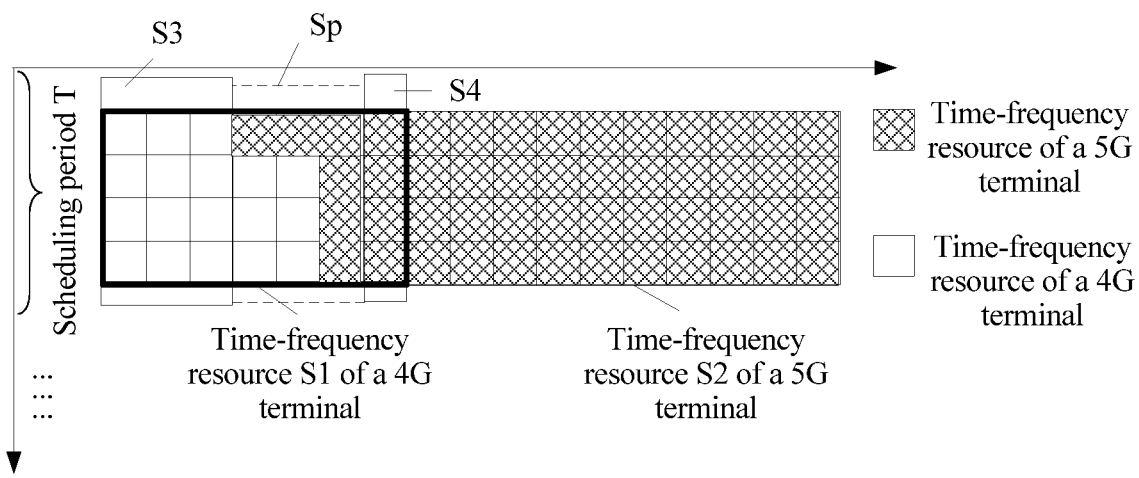
FIG. 22 is a schematic diagram of static allocation of a time-frequency resource according to another embodiment.

Specifically, in this embodiment, the base station may perform resource allocation for the 4G terminal and the 5G terminal once in each resource allocation period. When the resource allocation period may include an infinite quantity of scheduling periods T, in other words, allocation performed by the base station on the remaining time-frequency resource is static allocation, the base station divides the remaining time-frequency resource based on the network parameter, to determine the first time-frequency resource and the second time-frequency resource. Specifically, a schematic diagram of time-frequency resource allocation is shown in FIG. 22. It can be learned from the figure that the base station divides the remaining time domain resource only once based on the network parameter, allocates some of remaining time-frequency resources to the 5G terminal for use, and allocates the other remaining time-frequency resources to the 4G terminal for use. In each subsequent scheduling period T, both the terminals in two different RATs transmit data based on the time-frequency resources allocated by the base station.

Figure 23:
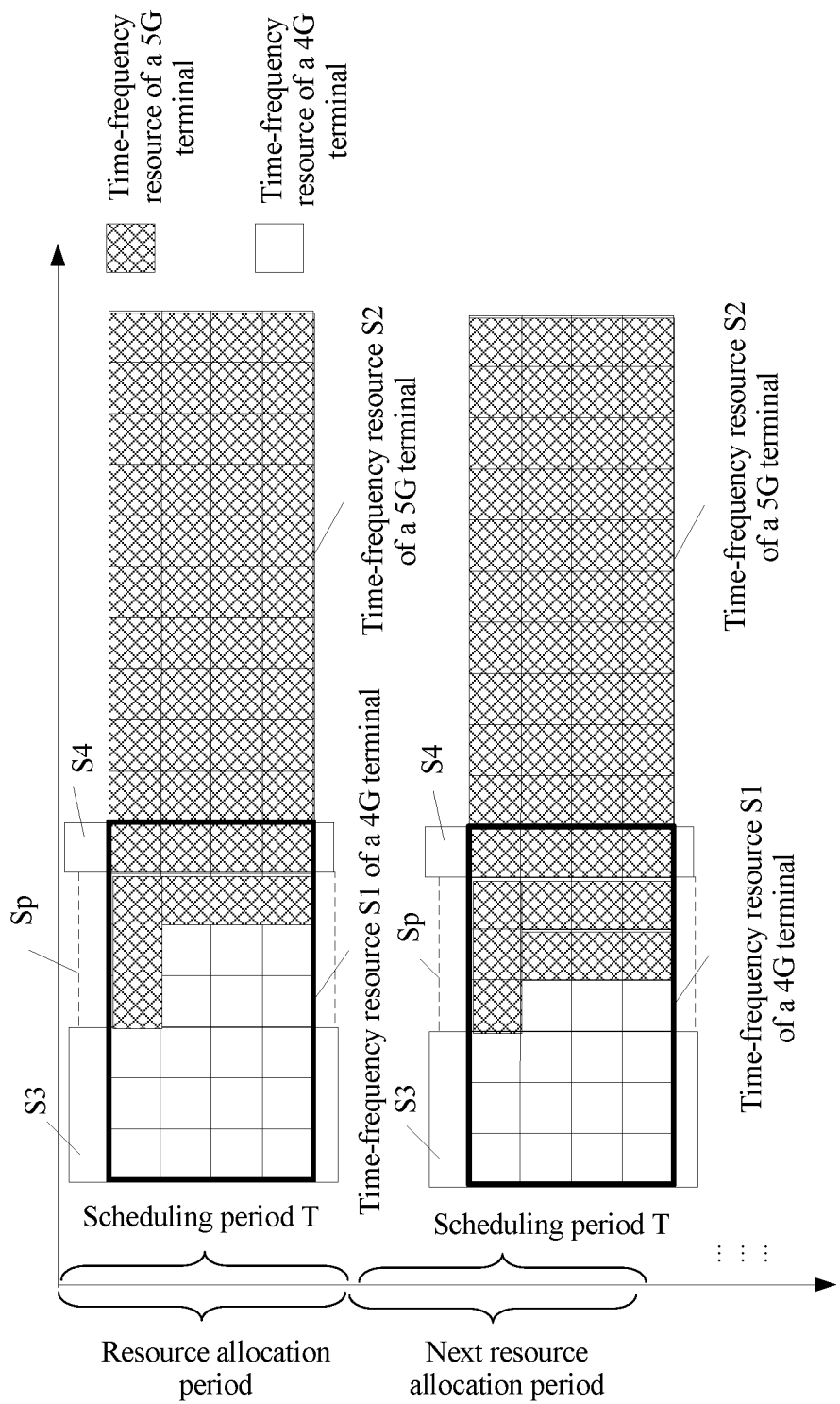
FIG. 23 is a schematic diagram of dynamic allocation of a time-frequency resource according to another embodiment.

It should be understood that the resource allocation period may alternatively include one scheduling period T. In this case, the base station divides the remaining time-frequency resource based on the network parameter in each scheduling period, to determine the first time-frequency resource and the second time-frequency resource. Specifically, a schematic diagram of time-frequency resource allocation is shown in FIG. 23. It can be learned from the figure that the base station may divide the remaining time-frequency domain resource based on the network parameter in each resource allocation period, namely, in each scheduling period T, and the terminals in two different RATs may transmit data based on the time-frequency resources allocated by the base station in the scheduling period.

Figure 24:
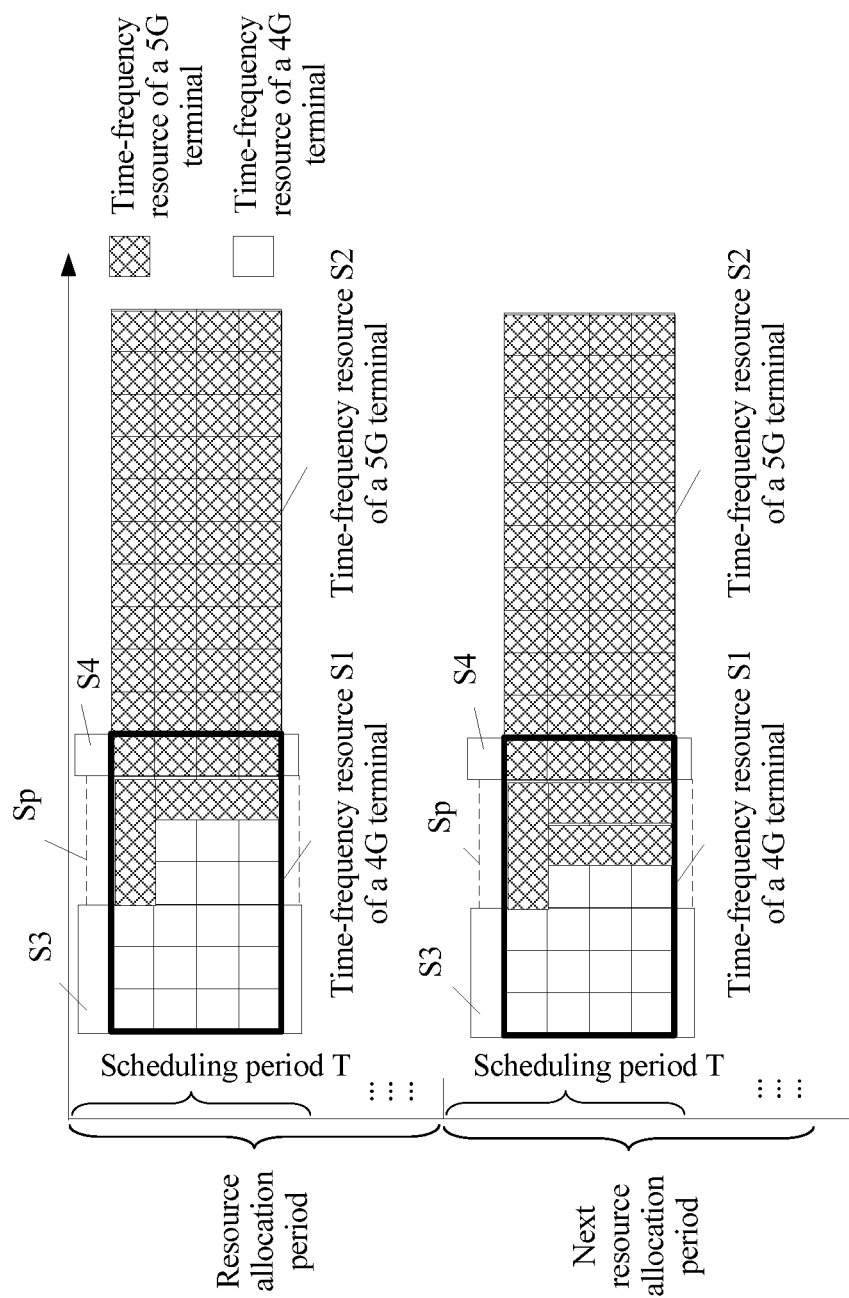
FIG. 24 is a schematic diagram of semi-static allocation of a time-frequency resource according to another embodiment.

It should be further understood that the resource allocation period may include a plurality of scheduling periods T. In each scheduling period in a resource allocation period, the terminals in two different RATs may transmit data based on the time-frequency resources allocated by the base station. In a next resource allocation period, the base station may re-divide the remaining time-frequency resource based on the network parameter, to select the first time-frequency resource for the 4G terminal from the target time-frequency resource, and select the second time-frequency resource for the 5G terminal from the target time-frequency resource. Specifically, a schematic diagram of time-frequency resource allocation is shown in FIG. 24.

It should be further understood that the base station may allocate the first time-frequency resource to the 4G terminal based on the network parameter, and allocate the second time-frequency resource to the 5G terminal based on the network parameter. The first time-frequency resource and the second time-frequency resource may be consecutive time-frequency resources or inconsecutive time-frequency resources.

It should be further understood that in this embodiment, the total quantity S1 of time-frequency resources of the 4G terminal may be the time-frequency resource that can be shared by the 4G terminal and the 5G terminal.

Optionally, in an embodiment, the dividing, by the base station, the remaining resource based on the network parameter, to determine the first resource and the second resource may further include:

selecting, by the base station, a first remaining resource and a second remaining resource from the remaining resource based on the network parameter; and determining, by the base station, the first remaining resource and the third resource as the first resource, and determining the second remaining resource and the fourth resource as the second resource.

Specifically, in this embodiment, the base station may directly divide the remaining resource, to determine the first remaining resource and the second remaining resource. The base station determines the first remaining resource and the pre-allocated third resource as the first resource, and determines the second remaining resource and the pre-allocated fourth resource as the second resource.

Specifically, as described above, the resource shared by the terminal in the first RAT and the terminal in the second RAT may be a time domain resource, a frequency domain resource, or a time-frequency resource. The terminal in the first RAT may be a 4G terminal, and the terminal in the second RAT may be a 5G terminal. The following separately describes, in detail by using an example in which the terminal in the first RAT may be the 4G terminal and the terminal in the second RAT may be the 5G terminal from a perspective that the shared resource is the time domain resource, a perspective that the shared resource is the frequency domain resource, and a perspective that the shared resource is the time-frequency resource, a method in which the base station divides the remaining resource based on the network parameter, to determine the first resource and the second resource in this embodiment.

Specifically, when the target resource is a time domain resource shared by the 4G terminal and the 5G terminal, the base station may obtain a third time domain resource pre-allocated to the 4G terminal and a fourth time domain resource pre-allocated to the 5G terminal. The base station may divide a remaining time domain resource in the target time domain resource other than the third time domain resource and the fourth time domain resource based on the quantity M of resources required by the 4G terminal, the available cell connection spectrum bandwidth W1 occupied by the 4G terminal, the quantity N of resources required by the 5G terminal, and the available cell connection spectrum bandwidth W2 occupied by the 5G terminal. For ease of understanding, herein, the third time domain resource pre-allocated by the base station to the 4G terminal is denoted as T3, the fourth time domain resource pre-allocated by the base station to the 5G terminal is denoted as T4, and the remaining time domain resource in the time domain resource shared by the 4G terminal and the 5G terminal other than T3 and T4 is denoted as Tp.

Based on the foregoing network parameters, the base station may divide the remaining time domain resource according to formulas (11) and (12):

$$Tp1 = \frac{M*W2}{M*W2 + N*W1} * Tp \qquad (11)$$

$$Tp2 = \frac{M*W1}{M*W2 + N*W1} * Tp \qquad (12)$$

Tp1 is a first remaining time domain resource in the remaining time domain resource Tp, and Tp2 is a second remaining time domain resource in the remaining time domain resource Tp. Based on calculation results of the formulas (11) and (12), the base station may determine Tp1 and the third time domain resource T3 pre-allocated to the 4G terminal as the first time domain resource, and determine Tp2 and the fourth time domain resource T4 pre-allocated to the 5G terminal as the second time domain resource.

Specifically, in this embodiment, when the target resource is a frequency domain resource shared by the 4G terminal and the 5G terminal, the base station may obtain a third frequency domain resource pre-allocated to the 4G terminal and a fourth frequency domain resource pre-allocated to the 5G terminal. The base station may divide a remaining frequency domain resource in the target frequency domain resource other than the third frequency domain resource and the fourth frequency domain resource based on the quantity M of resources required by the 4G terminal and the quantity N of resources required by the 5G terminal. For ease of understanding, herein, the third frequency domain resource pre-allocated by the base station to the 4G terminal is denoted as W3, the fourth frequency domain resource pre-allocated by the base station to the 5G terminal is denoted as W4, and the remaining frequency domain resource in the frequency domain resource shared by the 4G terminal and the 5G terminal other than W3 and W4 is denoted as Wp.

Based on the foregoing network parameters, the base station may divide the remaining frequency domain resource according to formulas (13) and (14):

$$Wp1 = \frac{M*Wp}{M+N} \qquad (13)$$

$$Wp2 = \frac{N*Wp}{M+N} \qquad (14)$$

Wp1 is a first remaining frequency domain resource in the remaining frequency domain resource Wp, and Wp2 is a second remaining frequency domain resource in the remaining frequency domain resource Wp.

Based on calculation results of the formulas (13) and (14), the base station may determine Wp1 and the third frequency domain resource W3 pre-allocated to the 4G terminal as the first frequency domain resource, and determine Wp2 and the fourth frequency domain resource W4 pre-allocated to the 5G terminal as the second frequency domain resource.

Specifically, in this embodiment, when the target resource is a time-frequency resource shared by the 4G terminal and the 5G terminal, the base station may obtain a third time-frequency resource pre-allocated to the 4G terminal and a fourth time-frequency resource pre-allocated to the 5G terminal. The base station may divide a remaining time-frequency resource in the target time-frequency resource other than the third time-frequency resource and the fourth time-frequency resource based on the quantity M of resources required by the 4G terminal and the quantity N of resources required by the 5G terminal. For ease of understanding, herein, the third time-frequency resource pre-allocated by the base station to the 4G terminal is denoted as S3, the fourth time-frequency resource pre-allocated by the base station to the 5G terminal is denoted as S4, and the remaining time-frequency resource in the time-frequency resource shared by the 4G terminal and the 5G terminal other than S3 and S4 is denoted as Sp.

Based on the foregoing network parameters, the base station may divide the remaining time-frequency resource according to formulas (15) and (16):

$$Sp1 = \frac{M * Sp}{M + N} \quad (15)$$

$$Sp2 = \frac{N * Sp}{M + N} \quad (16)$$

Sp1 is a first remaining time-frequency resource in the remaining time-frequency resource Sp, and Sp2 is a second remaining time-frequency resource in the remaining time-frequency resource Sp.

Based on calculation results of the formulas (15) and (16), the base station may determine Sp1 and the third time-frequency resource S3 pre-allocated to the 4G terminal as the first time-frequency resource, and determine Sp2 and the fourth time-frequency resource S4 pre-allocated to the 5G terminal as the second time-frequency resource.

Optionally, in some embodiments, the base station sends the first indication information to the terminal in the first RAT, where the first indication information is used to indicate the first resource used by the terminal in the first RAT, and the base station sends the second indication information to the terminal in the second RAT, where the second indication information is used to indicate the second resource used by the terminal in the second RAT. The first indication information and the second indication information may be included in same information, that is, the base station may send the same information to the terminal in the first RAT and the terminal in the second RAT, where the information may be referred to as resource allocation information. After receiving the resource allocation information, the terminal in the first RAT obtains the first indication information in the resource allocation information, and performs, based on the first indication information, data transmission with the base station on the first resource allocated by the base station. After receiving the resource allocation information, the terminal in the second RAT obtains the second indication information in the resource allocation information, and performs, based on the second indication information, data transmission with the base station on the second resource allocated by the base station.

It should be understood that in this embodiment, the base station may send the first indication information and/or the second indication information to the terminal in the first RAT and the terminal in the second RAT in the network by using a broadcast channel.

Optionally, in some embodiments, the method further includes: when the quantity of resources required by the terminal in the first RAT is greater than the quantity of resources required by the terminal in the second RAT, sending, by the base station, a subframe to the terminal in the second RAT, where the subframe is used to instruct the terminal in the second RAT to stop transmitting data on the second resource.

Specifically, in this embodiment, the base station may compare the quantity of resources required by the terminal in the first RAT with the quantity of resources required by the terminal in the second RAT. When the quantity of resources required by the terminal in the first RAT is greater than the quantity of resources required by the terminal in the second RAT, the base station may send the subframe to the terminal in the second RAT, where the subframe is used to instruct the terminal in the second RAT to stop transmitting the data on the second resource. In this case, the terminal in the first RAT may use all shared resources, in other words, the terminal in the first RAT may use the second resource allocated by the base station to the terminal in the second RAT.

In this embodiment, the base station may further set a threshold for a difference between the quantity of resources required by the terminal in the first RAT and the quantity of resources required by the terminal in the second RAT. When the difference between the quantity of resources required by the terminal in the first RAT and the quantity of resources required by the terminal in the second RAT is greater than the threshold, the base station may send the subframe to the terminal in the second RAT. When the difference between the quantity of resources required by the terminal in the first RAT and the quantity of resources required by the terminal in the second RAT is less than or equal to the threshold, the base station does not send the subframe, and the terminal in the first RAT and the terminal in the second RAT respectively transmit data on the first resource and the second resource determined by the base station from the target resource.

It should be understood that in this embodiment, when the quantity of resources required by the terminal in the first RAT is less than the quantity of resources required by the terminal in the second RAT, the base station may further send a subframe to the terminal in the first RAT, where the subframe is used to instruct the terminal in the first RAT to stop transmitting data on the first resource.

It should be further understood that the base station may periodically send the subframe to the terminal in the first RAT or the terminal in the second RAT based on the resource allocation period, or may aperiodic ally send the subframe to the terminal in the first RAT or the terminal in the second RAT.

The foregoing describes in detail the communication method according to embodiments from a perspective of the base station. The following describes in detail a communication method according to embodiments from a perspective of a terminal. It should be understood that the method embodiment on a base station side and the method embodiment on a terminal side are corresponding to each other. For a part that is not described in detail, refer to the foregoing method embodiment on the base station side.

Figure 25:
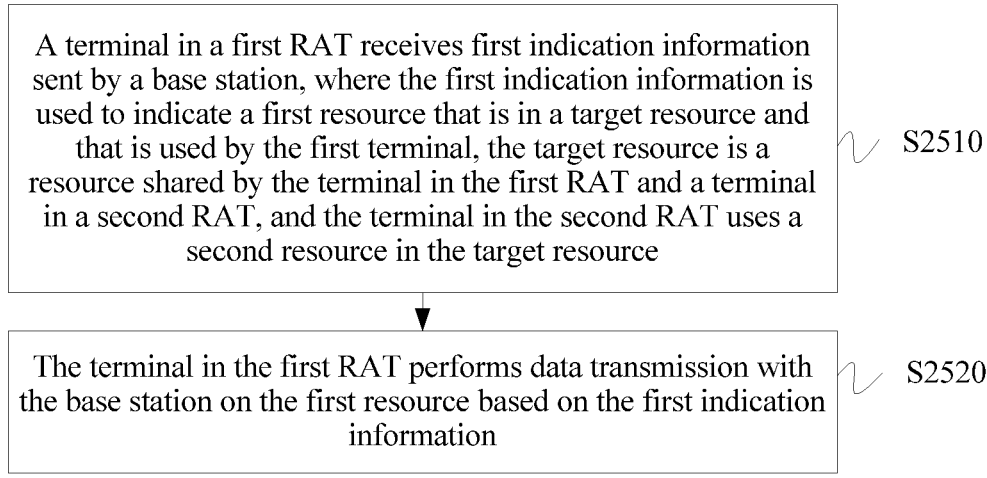
FIG. 25 is a schematic flowchart of a wireless communication method according to an embodiment.

FIG. 25 is a schematic flowchart of a communication method according to an embodiment. The method includes the following steps:

S2510. A terminal in a first RAT receives first indication information sent by a base station, where the first indication information is used to indicate a first resource that is in a target resource and that is used by the terminal in the first RAT, the target resource is a resource shared by the terminal in the first RAT and the terminal in a second RAT, and the terminal in the second RAT uses a second resource in the target resource.

S2520. The terminal in the first RAT performs data transmission with the base station on the first resource based on the first indication information.

In the technical solution, the terminal in the first RAT performs data transmission with the base station on the first resource determined by the base station from the target resource, and the terminal in the second RAT performs data transmission with the base station on the second resource selected by the base station from the target resource, to avoid a problem that shared resources are wasted because the terminal in the first RAT or the terminal in the second RAT separately uses the shared resources, thereby improving utilization of the shared resources.

Optionally, in some embodiments, the first resource is determined by the base station from the target resource based on a network parameter, and the network parameter includes at least one of the following parameters: a scheduling period, a quantity of resources required by the terminal in the first RAT, an available cell connection spectrum bandwidth of the terminal in the first RAT, a time-frequency resource occupied by the terminal in the first RAT, a quantity of resources required by the terminal in the second RAT, an available cell connection spectrum bandwidth of the terminal in the second RAT, or a time-frequency resource occupied by the terminal in the second RAT.

Optionally, in some embodiments, the shared resource is a shared time domain resource, a shared frequency domain resource, or a shared time-frequency resource.

Optionally, in some embodiments, the target resource is a resource in a resource allocation period, the resource allocation period includes N scheduling periods, and N is greater than or equal to 1.

Optionally, in some embodiments, the terminal in the first RAT may be a 5G terminal or a 4G terminal.

Optionally, in an embodiment, the method further includes: receiving, by the terminal in the first RAT, a subframe sent by the base station, where the subframe is used to instruct the terminal in the first RAT to stop transmitting data on the first resource.

The foregoing describes in detail method embodiments. The following describes in detail apparatus embodiments. It should be understood that the apparatus embodiments and the method embodiments are corresponding to each other. For a part that is not described in detail, refer to the foregoing method embodiments.

Figure 26:
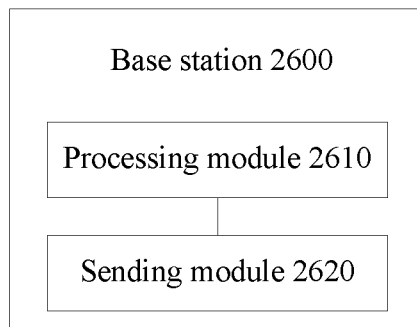
FIG. 26 is a schematic structural diagram of a base station according to an embodiment.

FIG. 26 is a schematic structural diagram of a base station 2600 according to an embodiment. The base station 2600 in FIG. 26 includes:

a processing module 2610, configured to determine a first resource and a second resource from a target resource, where the target resource is a resource shared by a terminal in a first RAT and a terminal in a second RAT, the first resource is a resource used by the terminal in the first RAT, and the second resource is a resource used by the terminal in the second RAT; and a sending module 2620, configured to send first indication information to the terminal in the first RAT, where the first indication information is used to indicate the first resource used by the terminal in the first RAT, where the sending module 2620 is further configured to send second indication information to the terminal in the second RAT, where the second indication information is used to indicate the second resource used by the terminal in the second RAT.

In this embodiment, the base station determines, from the resource shared by the terminal in the first RAT and the terminal in the second RAT, the first resource used by the terminal in the first RAT and the second resource used by the terminal in the second RAT, and allocates the resource shared by the terminal in the first RAT and the terminal in the second RAT to both the terminal in the first RAT and the terminal in the second RAT for use, to avoid a problem that shared resources are wasted because the terminal in the first RAT or the terminal in the second RAT separately uses the shared resources, thereby improving utilization of the shared resources.

Optionally, in some embodiments, the terminal in the first RAT may be a 4G terminal, and the terminal in the second RAT may be a 5G terminal, but the embodiment is not limited thereto. For example, the terminal in the first RAT may alternatively be a 3rd Generation (3G) mobile communication terminal, and the terminal in the second RAT may alternatively be a 4G terminal.

Optionally, in some embodiments, the resource shared by the terminal in the first RAT and the terminal in the second RAT may be a shared time domain resource, a shared frequency domain resource, or a shared time-frequency resource.

For example, a time domain resource shared by the terminal in the first RAT and the terminal in the second RAT may be transmission duration, a system frame, a subframe, or the like. A frequency domain resource shared by the terminal in the first RAT and the terminal in the second RAT may be frequency bandwidth, a subcarrier, a spectrum resource, or the like. A time-frequency resource shared by the terminal in the first RAT and the terminal in the second RAT may be a resource block (RB) or the like.

Optionally, in some embodiments, the first resource selected by the base station for the terminal in the first RAT and the second resource selected by the base station for the terminal in the second RAT may be consecutive resources or inconsecutive resources.

Optionally, in some embodiments, the target resource may be a resource in a resource allocation period, the resource allocation period includes N scheduling periods, and N is greater than or equal to 1.

Specifically, the base station may determine the first resource and the second resource from the target resource in each resource allocation period, to periodically allocate the target resource, so that different first resources and second resources can be allocated to the terminals in two RATs in different resource allocation periods, to further improve utilization of shared resources.

Specifically, in this embodiment, the base station may perform, in each resource allocation period, resource allocation once on the target resource in the resource allocation period. In a current resource allocation period, the base station performs data transmission with the terminals in different RATs based on a result of determining a currently shared resource. In a next resource allocation period, the base station may re-determine, from the target resource, the first resource used by the terminal in the first RAT and the second resource used by the terminal in the second RAT.

It should be understood that in this embodiment, the resource allocation period may include one scheduling period. In this case, allocation performed by the base station on the target resource in each resource allocation period may be referred to as dynamic allocation. Alternatively, the resource allocation period may include a plurality of scheduling periods. In this case, allocation performed by the base station on the target resource in each resource allocation period may be referred to as semi-static allocation. Alternatively, the resource allocation period may include an infinite quantity of scheduling periods. In this case, allocation performed by the base station on the target resource may be referred to as static allocation.

Optionally, in some embodiments, that a processing module determines a first resource and a second resource from a target resource may include: presetting, by the base station, the first resource and the second resource in an initialization process.

Optionally, in some embodiments, the processing module is further configured to obtain a network parameter, where the network parameter includes at least one of the following parameters: a scheduling period, a quantity of resources required by the terminal in the first RAT, an available cell connection spectrum bandwidth of the terminal in the first RAT, a time-frequency resource occupied by the terminal in the first RAT, a quantity of resources required by the terminal in the second RAT, an available cell connection spectrum bandwidth of the terminal in the second RAT, or a time-frequency resource occupied by the terminal in the second RAT.

The processing module is further configured to determine the first resource and the second resource from the target resource based on the network parameter.

Optionally, in some embodiments, the processing module is specifically configured to: determine a third resource pre-allocated to the terminal in the first RAT and a fourth resource pre-allocated to the terminal in the second RAT, where the target resource includes the third resource, the fourth resource, and a remaining resource other than the third resource and the fourth resource; and divide the remaining resource based on the network parameter, to determine the first resource and the second resource, where the first resource includes the third resource, the second resource includes the fourth resource, and a sum of the first resource and the second resource includes the remaining resource.

Optionally, in some embodiments, the processing module is specifically configured to: determine, based on the network parameter, a first reference resource required by the terminal in the first RAT; and when the first reference resource is less than the third resource, determine the third resource as the first resource, and determine the fourth resource and the remaining resource as the second resource; or when the first reference resource is greater than a sum of the third resource and the remaining resource, determine the sum of the third resource and the remaining resource as the first resource, and determine the fourth resource as the second resource; or when the first reference resource is greater than the third resource, and is less than a sum of the third resource and the remaining resource, determine the first reference resource as the first resource, and determine a resource in the shared resource other than the first reference resource as the second resource.

Optionally, in some embodiments, the base station further includes the sending module 2620, configured to: when the quantity of resources required by the terminal in the first RAT is greater than the quantity of resources required by the terminal in the second RAT, send a subframe to the terminal in the second RAT, where the subframe is used to instruct the terminal in the second RAT to stop transmitting data on the second resource.

The foregoing describes in detail the base station embodiment. The following describes in detail a terminal embodiment.

Figure 27:
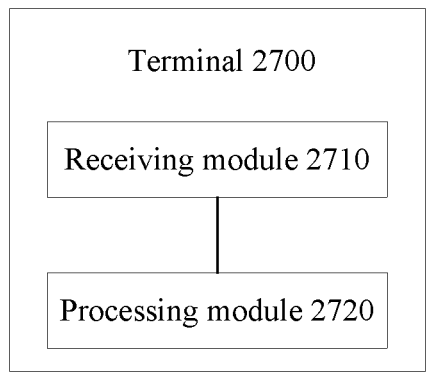
FIG. 27 is a schematic structural diagram of a terminal according to an embodiment.

FIG. 27 is a schematic structural diagram of a terminal according to an embodiment. The terminal 2700 in FIG. 27 includes:

a receiving module 2710, configured to receive first indication information sent by a base station, where the first indication information is used to indicate a first resource that is in a target resource and that is used by the terminal, the target resource is a resource shared by the terminal and the terminal in a second RAT, the terminal in the second RAT uses a second resource in the target resource, and the terminal and the terminal in the second RAT are terminals in different RATs; and a processing module 2720, configured to perform data transmission with the base station on the first resource based on the first indication information.

In this embodiment, the terminal performs data transmission with the base station on the first resource determined by the base station from the target resource, and the terminal in the second RAT performs data transmission with the base station on the second resource selected by the base station from the target resource, to avoid a problem that shared resources are wasted because the terminal or the terminal in the second RAT separately uses the shared resources, thereby improving utilization of the shared resources.

Optionally, in some embodiments, the first resource is determined by the base station from the target resource based on a network parameter, and the network parameter includes at least one of the following parameters: a scheduling period, a quantity of resources required by the terminal in a first RAT, an available cell connection spectrum bandwidth of the terminal in the first RAT, a time-frequency resource occupied by the terminal in the first RAT, a quantity of resources required by the terminal in the second RAT, an available cell connection spectrum bandwidth of the terminal in the second RAT, or a time-frequency resource occupied by the terminal in the second RAT.

Optionally, in some embodiments, the shared resource is a shared time domain resource, a shared frequency domain resource, or a shared time-frequency resource.

Optionally, in some embodiments, the target resource is a resource in a resource allocation period, the resource allocation period includes N scheduling periods, and N is greater than or equal to 1.

Optionally, in some embodiments, the terminal in the first RAT may be a 5G terminal or a 4G terminal.

Optionally, in some embodiments, the receiving module is further configured to receive a subframe sent by the base station, where the subframe is used to instruct the terminal device in the first RAT to stop transmitting data on the first resource.

Figure 28:
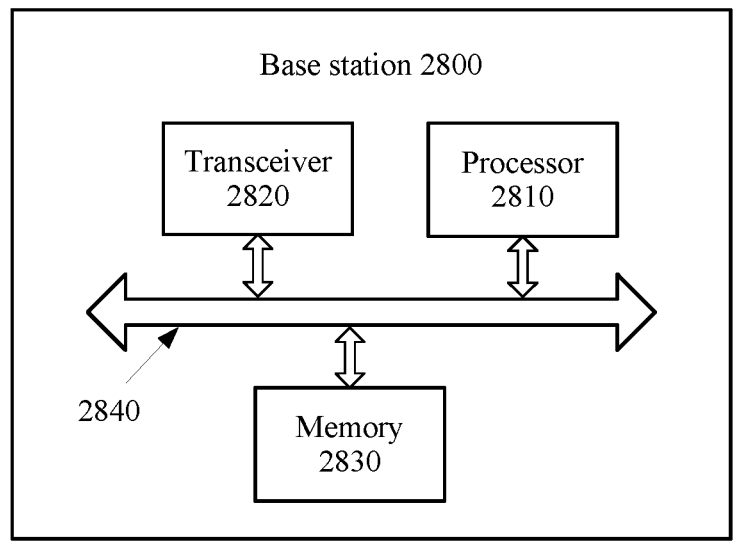
FIG. 28 is a schematic structural diagram of a base station according to another embodiment.

FIG. 28 is a schematic structural diagram of a base station according to another embodiment. The base station 2800 in FIG. 28 includes:

a processor 2810, configured to determine a first resource and a second resource from a target resource, where the target resource is a resource shared by a terminal in a first RAT and a terminal in a second RAT, the first resource is a resource used by the terminal in the first RAT, and the second resource is a resource used by the terminal in the second RAT; and a transceiver 2820, configured to send first indication information to the terminal in the first RAT, where the first indication information is used to indicate the first resource used by the terminal in the first RAT, where the transceiver 2820 is further configured to send second indication information to the terminal in the second RAT, where the second indication information is used to indicate the second resource used by the terminal in the second RAT.

In this embodiment, the base station determines, from the resource shared by the terminal in the first RAT and the terminal in the second RAT, the first resource used by the terminal in the first RAT and the second resource used by the terminal in the second RAT, and allocates the resource shared by the terminal in the first RAT and the terminal in the second RAT to both the terminal in the first RAT and the terminal in the second RAT for use, to avoid a problem that shared resources are wasted because the terminal in the first RAT or the terminal in the second RAT separately uses the shared resources, thereby improving utilization of the shared resources.

Optionally, in some embodiments, the terminal in the first RAT may be a terminal in a 4G mode, and the terminal in the second RAT may be a terminal in a 5G mode, but the embodiment is not limited thereto. For example, the terminal in the first RAT may alternatively be a 3rd Generation (3G) mobile communication terminal, and the terminal in the second RAT may alternatively be a 4G terminal.

Optionally, in some embodiments, the resource shared by the terminal in the first RAT and the terminal in the second RAT may be a shared time domain resource, a shared frequency domain resource, or a shared time-frequency resource.

Optionally, in some embodiments, the first resource selected by the base station for the terminal in the first RAT and the second resource selected by the base station for the terminal in the second RAT may be consecutive resources or inconsecutive resources.

Optionally, in some embodiments, the target resource may be a resource in a resource allocation period, the resource allocation period includes N scheduling periods, and N is greater than or equal to 1.

Optionally, in some embodiments, that a processor 2810 determines a first resource and a second resource from a target resource may include: presetting, by the base station, the first resource and the second resource in an initialization process.

Optionally, in some embodiments, the processor 2810 is further configured to obtain a network parameter, where the network parameter includes at least one of the following parameters: a scheduling period, a quantity of resources required by the terminal in the first RAT, an available cell connection spectrum bandwidth of the terminal in the first RAT, a time-frequency resource occupied by the terminal in the first RAT, a quantity of resources required by the terminal in the second RAT, an available cell connection spectrum bandwidth of the terminal in the second RAT, or a time-frequency resource occupied by the terminal in the second RAT.

The processor 2810 is further specifically configured to determine the first resource and the second resource from the target resource based on the network parameter.

Optionally, in some embodiments, the processor 2810 is further specifically configured to: determine a third resource pre-allocated to the terminal in the first RAT and a fourth resource pre-allocated to the terminal in the second RAT, where the target resource includes the third resource, the fourth resource, and a remaining resource other than the third resource and the fourth resource; and divide the remaining resource based on the network parameter, to determine the first resource and the second resource, where the first resource includes the third resource, the second resource includes the fourth resource, and a sum of the first resource and the second resource includes the remaining resource.

In some embodiments, the processor 2810 is further specifically configured to: determine, based on the network parameter, a first reference resource required by the terminal in the first RAT; and when the first reference resource is less than the third resource, determine the third resource as the first resource, and determine the fourth resource and the remaining resource as the second resource; or when the first reference resource is greater than a sum of the third resource and the remaining resource, determine the sum of the third resource and the remaining resource as the first resource, and determine the fourth resource as the second resource; or when the first reference resource is greater than the third resource, and is less than a sum of the third resource and the remaining resource, determine the first reference resource as the first resource, and determine a resource in the shared resource other than the first reference resource as the second resource.

Optionally, in some embodiments, the transceiver 2820 is further configured to: when the quantity of resources required by the terminal in the first RAT is greater than the quantity of resources required by the terminal in the second RAT, send a subframe to the terminal in the second RAT, where the subframe is used to instruct the terminal in the second RAT to stop transmitting data on the second resource.

Figure 29:
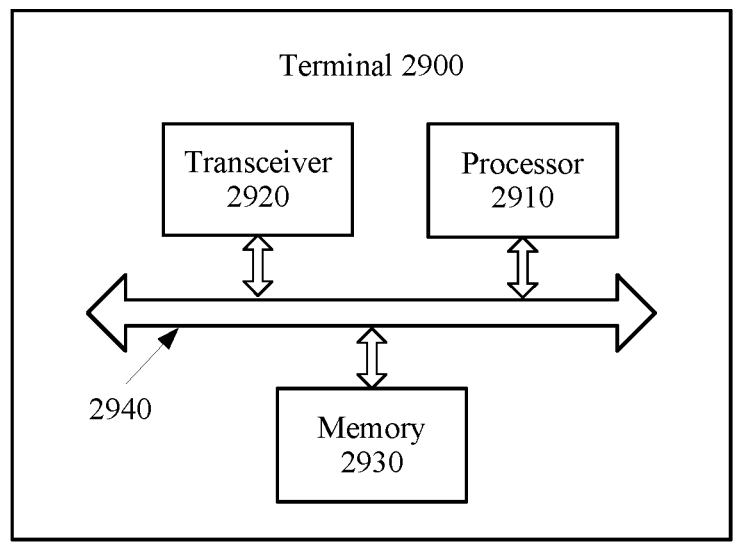
FIG. 29 is a schematic structural diagram of a terminal according to another embodiment.

FIG. 29 is a schematic structural diagram of a terminal according to another embodiment. The terminal 2900 in FIG. 29 includes:

a memory 2930, configured to store a program; and a processor 2910, configured to execute the program, where when executing the program, the processor 2910 is configured to enable a transceiver 2920, and the transceiver 2920 is configured to receive first indication information sent by a base station, where the first indication information is used to indicate a first resource that is in a target resource and that is used by the terminal, the target resource is a resource shared by the terminal and the terminal in a second RAT, the terminal in the second RAT uses a second resource in the target resource, and the terminal and the terminal in the second RAT are terminals in different RATs; and the transceiver 2920 is further configured to perform data transmission with the base station on the first resource based on the first indication information.

In this embodiment, the terminal performs data transmission with the base station on the first resource determined by the base station from the target resource, and the terminal in the second RAT performs data transmission with the base station on the second resource selected by the base station from the target resource, to avoid a problem that shared resources are wasted because the terminal or the terminal in the second RAT separately uses the shared resources, thereby improving utilization of the shared resources.

Optionally, in some embodiments, the first resource is determined by the base station from the target resource based on a network parameter, and the network parameter includes at least one of the following parameters: a scheduling period, a quantity of resources required by the terminal in a first RAT, an available cell connection spectrum bandwidth of the terminal in the first RAT, a time-frequency resource occupied by the terminal in the first RAT, a quantity of resources required by the terminal in the second RAT, an available cell connection spectrum bandwidth of the terminal in the second RAT, or a time-frequency resource occupied by the terminal in the second RAT.

Optionally, in some embodiments, the shared resource is a shared time domain resource, a shared frequency domain resource, or a shared time-frequency resource.

Optionally, in some embodiments, the target resource is a resource in a resource allocation period, the resource allocation period includes N scheduling periods, and N is greater than or equal to 1.

Optionally, in some embodiments, the terminal in the first RAT may be a terminal in a 5G mode or a terminal in a 4G mode.

Optionally, in some embodiments, the transceiver 2920 is further configured to receive a subframe sent by the base station, where the subframe is used to instruct the terminal in the first RAT to stop transmitting data on the first resource.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of embodiments of the invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method comprising:
   determining, by a base station, a first resource and a second resource from a target resource, wherein the target resource is a resource shared by at least one terminal in a first Radio Access Technology (RAT) and at least one terminal in a second RAT, the first resource being a resource used by the terminal in the first RAT, and the second resource being a resource used by the terminal in the second RAT;
   sending, by the base station, first indication information to the terminal in the first RAT, wherein the first indication information is used to indicate the first resource to be used by the terminal in the first RAT; and
   sending, by the base station, second indication information to the terminal in the second RAT, wherein the second indication information is used to indicate the second resource to be used by the terminal in the second RAT,
   wherein determining the first resource and the second resource from the target resource comprises:
      obtaining, by the base station, a network parameter, wherein the network parameter comprises at least one of the following parameters: a scheduling period, a quantity of resources required by the terminal in the first RAT, an available cell connection spectrum bandwidth of the terminal in the first RAT, a time-frequency resource of the terminal in the first RAT, a quantity of resources required by the terminal in the second RAT, an available cell connection spectrum bandwidth of the terminal in the second RAT, or a time-frequency resource occupied by the terminal in the second RAT, and
      determining, by the base station, the first resource and the second resource from the target resource based on the network parameter,
   wherein determining the first resource and the second resource from the target resource based on the network parameter comprises:
      determining, by the base station, a third resource pre-allocated to the terminal in the first RAT and a fourth resource pre-allocated to the terminal in the second RAT, wherein the target resource comprises the third resource, the fourth resource, and a remaining resource other than the third resource and the fourth resource, and
      dividing, by the base station, the remaining resource based on the network parameter, wherein the first resource comprises the third resource, the second resource comprises the fourth resource, and a sum of the first resource and the second resource comprises the remaining resource.

2. The method according to claim 1, wherein dividing the remaining resource based on the network parameter comprises:

determining, by the base station based on the network parameter, a first reference resource required by the terminal in the first RAT; and when the first reference resource is less than the third resource, determining, by the base station, the third resource as the first resource, and determining the fourth resource and the remaining resource as the second resource; or when the first reference resource is greater than a sum of the third resource and the remaining resource, determining, by the base station, the sum of the third resource and the remaining resource as the first resource, and determining the fourth resource as the second resource; or when the first reference resource is greater than the third resource, and is less than a sum of the third resource and the remaining resource, determining, by the base station, the first reference resource as the first resource, and determining a resource in the shared resource other than the first reference resource as the second resource.

3. The method according to claim 1, further comprising:
when a number of resources required by the terminal in the first RAT is greater than a number of resources required by the terminal in the second RAT, sending, by the base station, a subframe to the terminal in the second RAT, wherein the subframe is used to instruct the terminal in the second RAT to stop transmitting data on the second resource.

4. The method according to claim 1, wherein the target resource is a resource in a resource allocation period, and wherein the resource allocation period comprises N scheduling periods, and N is greater than or equal to 1.

5. The method according to claim 1, wherein the shared resource is a shared time domain resource.

6. The method according to claim 1, wherein the terminal in the first RAT is a $_4$th Generation ($_4$G) terminal, and wherein the terminal in the second RAT is a $_5$th Generation ($_5$G) terminal.

7. A communication method comprising:
receiving, by a terminal in a first Radio Access Technology (RAT), first indication information sent by a base station, wherein the first indication information is used to indicate a first resource that is in a target resource and that is to be used by the terminal in the first RAT, the target resource being a resource shared by the terminal in the first RAT and a terminal in a second RAT, and wherein a second resource in the target resource is to be used by the terminal in the second RAT;

performing, by the terminal in the first RAT, data transmission with the base station on the first resource based on the first indication information; and performing, by the terminal in the first RAT, data transmission with the base station on the second resource when a number of resources required by the terminal in the first RAT is greater than a number of resources required by the terminal in the second RAT, and when the terminal in the second RAT stopped transmitting data on the second resource based on a subframe sent by the base station to the terminal in the second RAT, wherein the subframe is used to instruct the terminal in the second RAT to stop transmitting data on the second resource.

8. The method according to claim 7, wherein the first resource is determined by the base station from the target resource based on a network parameter, and wherein the network parameter comprises at least one of the following parameters: a scheduling period, a quantity of resources required by the terminal in the first RAT, an available cell connection spectrum bandwidth of the terminal in the first RAT, a time-frequency resource occupied by the terminal in the first RAT, a quantity of resources required by the terminal in the second RAT, an available cell connection spectrum bandwidth of the terminal in the second RAT, or a time-frequency resource occupied by the terminal in the second RAT.

9. The method according to claim 7, further comprising:
receiving, by the terminal in the first RAT, a subframe sent by the base station, wherein the subframe is used to instruct the terminal in the first RAT to stop transmitting data on the first resource.

10. The method according to claim 7, wherein the target resource is a resource in a resource allocation period, and wherein the resource allocation period comprises N scheduling periods, and N is greater than or equal to 1.

11. The method according to claim 7, wherein the shared resource is a shared time domain resource, a shared frequency domain resource, or a shared time-frequency resource.

12. The method according to claim 7, wherein the terminal in the first RAT is a $_5$th Generation ($_5$G) terminal or a $_4$th Generation ($_4$G) terminal.

13. A terminal in a first Radio Access Technology (RAT) comprising:
a receiver configured to receive first indication information sent by a base station, wherein the first indication information is used to indicate a first resource that is in a target resource and that is to be used by the terminal in the first RAT, the target resource being a resource shared by the terminal in the first RAT and a terminal in a second RAT, wherein a second resource in the target resource is to be sued by the terminal in the second RAT, and wherein the terminal in the first RAT and the terminal in the second RAT are terminals in different RATs; and a processor configured to:
perform data transmission with the base station on the first resource based on the first indication information: and perform data transmission with the base station on the second resource when a number of resources required by the terminal in the first RAT is greater than a number of resources required by the terminal in the second RAT, and when the terminal in the second RAT stopped transmitting data on the second resource based on a subframe sent by the base station to the terminal in the second RAT, wherein the subframe is used to instruct the terminal in the second RAT to stop transmitting data on the second resource.

14. The terminal in the first RAT according to claim 13, wherein the first resource is determined by the base station from the target resource based on a network parameter, and wherein the network parameter comprises at least one of the following parameters: a scheduling period, a quantity of resources required by a terminal in a first RAT, an available cell connection spectrum bandwidth of the terminal in the first RAT, a time-frequency resource occupied by the terminal in the first RAT, a quantity of resources required by the terminal in the second RAT, an available cell connection spectrum bandwidth of the terminal in the second RAT, or a time-frequency resource occupied by the terminal in the second RAT.

15. The terminal in the first RAT according to claim 13, wherein the receiver is further configured to receive a subframe sent by the base station, and wherein the subframe is used to instruct the terminal in the first RAT to stop transmitting data on the first resource.

16. The terminal in the first RAT according to claim 13, wherein the target resource is a resource in a resource allocation period, and wherein the resource allocation period comprises N scheduling periods, and N is greater than or equal to 1.

17. The terminal in the first RAT according to claim 13, wherein the shared resource is a shared time domain resource, a shared frequency domain resource, or a shared time-frequency resource.

18. The terminal in the first RAT according to claim 13, wherein the terminal in the first RAT is a $_5$th Generation ($_5$G) terminal or a $_4$th Generation ($_4$G) terminal.

19. The method according to claim 1, wherein the shared resource is a shared frequency domain resource.

20. The method according to claim 1, wherein the shared resource is a shared time-frequency resource.

* * * * *